US012439540B2

(12) United States Patent
Kang et al.

(10) Patent No.: US 12,439,540 B2
(45) Date of Patent: Oct. 7, 2025

(54) ELECTRONIC DEVICE INCLUDING DISPLAY SUPPORT STRUCTURE

(71) Applicant: SAMSUNG ELECTRONICS CO., LTD., Suwon-si (KR)

(72) Inventors: Jihoon Kang, Suwon-si (KR); Jonghwan Choi, Suwon-si (KR); Wonyoung Seo, Suwon-si (KR); Halim Choi, Suwon-si (KR); Chijoon Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 182 days.

(21) Appl. No.: 17/886,757

(22) Filed: Aug. 12, 2022

(65) Prior Publication Data

US 2023/0262914 A1    Aug. 17, 2023

Related U.S. Application Data

(63) Continuation of application No. PCT/KR2022/011008, filed on Jul. 27, 2022.

(30) Foreign Application Priority Data

Aug. 9, 2021   (KR) .................. 10-2021-0104432
Dec. 14, 2021  (KR) .................. 10-2021-0178869

(51) Int. Cl.
  *H05K 5/06*    (2006.01)
  *H05K 5/02*    (2006.01)
(52) U.S. Cl.
  CPC ............. *H05K 5/06* (2013.01); *H05K 5/0226* (2013.01)

(58) Field of Classification Search
  CPC ...... H05K 5/06; H05K 5/0226; G06F 1/1616; G06F 1/1647; G06F 1/165; G06F 1/1652;
  (Continued)

(56) References Cited

U.S. PATENT DOCUMENTS

2016/0048169 A1   2/2016   Yang et al.
2017/0192460 A1   7/2017   Watanabe et al.
(Continued)

FOREIGN PATENT DOCUMENTS

CN   210780955 U   6/2020
CN   112162597 A   1/2021
(Continued)

OTHER PUBLICATIONS

Japanese Office action for Japanese Patent Application No. 2022-552360 dated Oct. 3, 2023.
(Continued)

*Primary Examiner* — Allen L Parker
*Assistant Examiner* — Keon Kim
(74) *Attorney, Agent, or Firm* — CANTOR COLBURN LLP

(57) ABSTRACT

An electronic device includes a housing including a first housing, and a second housing which is rotatably coupled to the first housing, a flexible display facing the first and second housings and including a folding area, a waterproof member between the housing and the flexible display, and a support structure between the housing and the flexible display, where the support structure includes a first part having a first height and a second part having a second height greater than the first height, and the second part is overlapping the folding area.

20 Claims, 20 Drawing Sheets

(58) Field of Classification Search
CPC .... G06F 1/1656; G06F 1/1681; H04M 1/022; H04M 1/0264; H04M 1/0216; H04M 1/0268
See application file for complete search history.

(56) References Cited

U.S. PATENT DOCUMENTS

| | | | |
|---|---|---|---|
| 2018/0335679 | A1 | 11/2018 | Hashimoto et al. |
| 2018/0356859 | A1* | 12/2018 | Hamburgen .......... G06F 1/1626 |
| 2019/0006615 | A1* | 1/2019 | Jung ..................... H10K 59/40 |
| 2019/0181194 | A1 | 6/2019 | Wu et al. |
| 2019/0254129 | A1* | 8/2019 | Cho .................. H10K 59/8722 |
| 2020/0057471 | A1 | 2/2020 | Nam et al. |
| 2020/0137911 | A1 | 4/2020 | Kim et al. |
| 2020/0162596 | A1* | 5/2020 | Kim .................... H04M 1/0216 |
| 2020/0218311 | A1* | 7/2020 | Park .................... H04M 1/0214 |
| 2020/0260603 | A1 | 8/2020 | Choi et al. |
| 2020/0319672 | A1 | 10/2020 | Kim et al. |
| 2021/0116964 | A1 | 4/2021 | Moon et al. |
| 2021/0141416 | A1 | 5/2021 | Cho et al. |
| 2021/0201710 | A1 | 7/2021 | Kim et al. |
| 2021/0249625 | A1* | 8/2021 | Kim ..................... G06F 1/1643 |
| 2022/0107666 | A1 | 4/2022 | Kim et al. |
| 2024/0028078 | A1* | 1/2024 | Zhao ................... G06F 1/1652 |

FOREIGN PATENT DOCUMENTS

| | | | |
|---|---|---|---|
| CN | 113141423 | A | 7/2021 |
| EP | 3151524 | A1 | 12/2018 |
| JP | 2019144972 | A | 8/2019 |
| JP | 2020522730 | A | 7/2020 |
| KR | 20160020644 | A | 2/2016 |
| KR | 20160128121 | A | 11/2016 |
| KR | 20200033001 | A | 3/2020 |
| KR | 1020200046628 | A | 5/2020 |
| KR | 1020200057236 | A | 5/2020 |
| KR | 20200097854 | A | 8/2020 |
| KR | 102150390 | B1 | 9/2020 |
| KR | 20200108754 | A | 9/2020 |
| KR | 1020210024943 | A | 3/2021 |
| KR | 20210047753 | A | 4/2021 |
| KR | 1020210059090 | A | 5/2021 |
| KR | 20210086745 | A | 7/2021 |

OTHER PUBLICATIONS

Korean Notice of Allowance for Korean Patent Application No. 10-2021-0178869 dated Aug. 18, 2023.
International Search Report for International Application No. PCT/KR2022/011008 (Translation, date of mailing Nov. 7, 2022).
European Search Report for European Patent Application No. 22856067.8 dated Oct. 1, 2024.

* cited by examiner

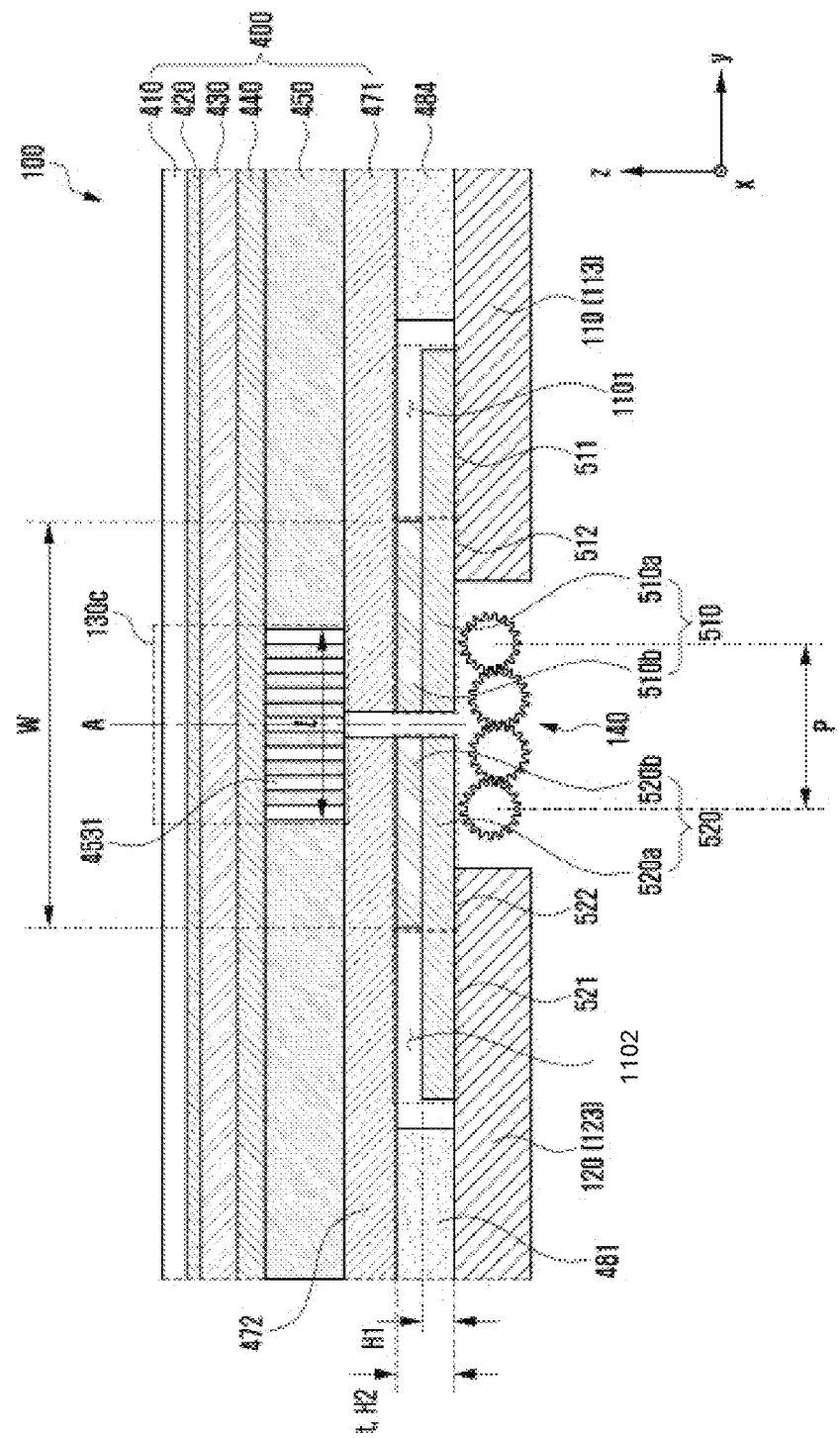

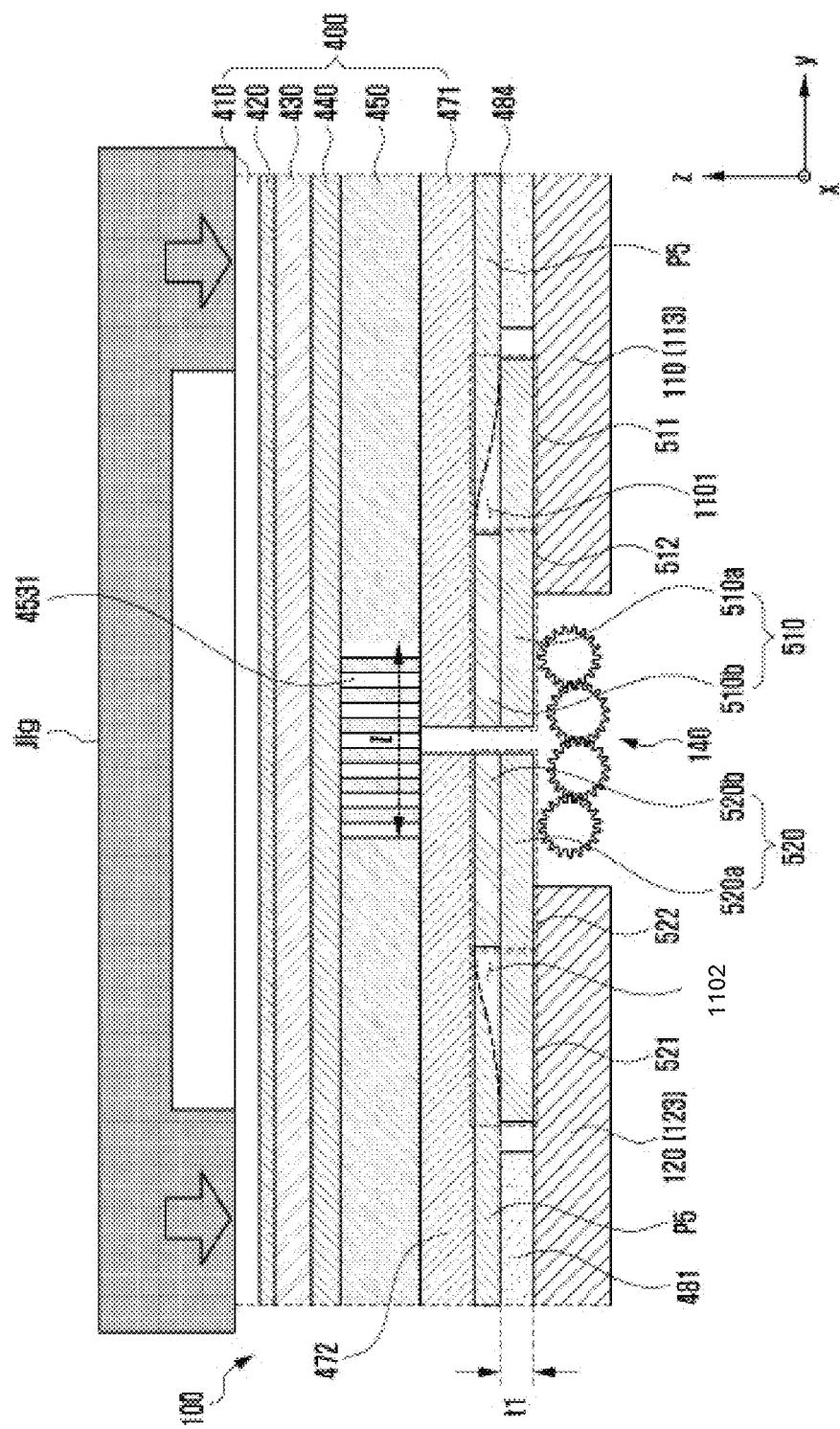

ELECTRONIC DEVICE INCLUDING DISPLAY SUPPORT STRUCTURE

CROSS-REFERENCE TO RELATED APPLICATIONS

This application is a PCT-Bypass Continuation application of International Application No. PCT/KR2022/011008 designating the United States, filed on Jul. 27, 2022, in the Korean Intellectual Property Receiving Office, which claims priority to Korean Patent Application No. 10-2021-0104432, filed on Aug. 9, 2021 and Korean Patent Application No. 10-2021-0178869, filed on Dec. 14, 2021, in the Korean Intellectual Property Office, and all the benefits accruing therefrom under 35 U.S.C. § 119, the disclosures of which are incorporated by reference herein in their entireties.

TECHNICAL FIELD

Various embodiments of the disclosure relate to an electronic device including a display support structure.

BACKGROUND ART

Electronic devices have gradually become slimmer and have been improved to increase the rigidity of the electronic devices, to enhance design aspects thereof, and to differentiate functional elements thereof. Electronic devices have evolved from unilateral rectangular shapes to more diversified shapes. Electronic devices may have deformable structures such that large-screen displays can be used while guaranteeing portability.

As an example of the deformable structure, an electronic device may include foldable housings operating so as to fold portions thereof onto or unfold portions thereof from each other. Such an electronic device may require a support structure for improving the durability and/or surface quality of a folding area in which the electronic device is deformed by folding and unfolding operations.

DISCLOSURE

Technical Problem

A foldable electronic device may include a hinge device (for example, hinge module) and first and second housings which are connected through the hinge device to be foldable with regard to each other (for example, folding). Such a foldable electronic device may operate in an in-folding and/or out-folding type as the first housing rotates in a specific range of 0-360° with regard to the second housing through the hinge device. The foldable electronic device may include a flexible display (for example, a display) disposed across the first and second housings when the electronic device is unfolded by 180°.

Foldable electronic devices may have poor waterproofing due to the folding and unfolding operation mechanisms. Therefore, the electronic devices may include at least one waterproof member for waterproofing and/or dustproofing against inflowing moisture or foreign matters. For example, the waterproof member may include at least one first waterproof member disposed between a first housing and a flexible display in a first space of the first housing, and at least one second waterproof member disposed between a second housing and the flexible display in a second space of the second housing. Such a waterproof member has a height, and in order to compensate therefor, a support structure having a designated height may be disposed between the first and second waterproof members, in the first and second spaces.

However, if such a support structure is disposed near at least one waterproof member with the same height (for example, thickness), the waterproof member which is attached through compression, may have a non-attachment area caused by the physical level difference of the support structure (for example, the height), thereby resulting in poor waterproofing. In addition, if the support structure is given a lower height than the waterproof member in an attempt to avoid poor waterproofing, durability and/or surface quality may be degraded by sagging caused by a gap occurring between the flexible display and the support structure. Moreover, there may be difficulty in configuring the height of the support structure in view of compression of the waterproof member.

Various embodiments of the disclosure may provide an electronic device including a display support structure.

Various embodiments may provide an electronic device including a display support structure capable of improving the surface quality or durability of a flexible display.

Various embodiments may provide an electronic device including a display support structure capable of improving the waterproof performance of a waterproof member.

Problems to be solved by the disclosure are not limited to the above-mentioned problems, and may be variously expanded without deviating from the idea and scope of the disclosure.

Technical Solution

According to various embodiments, an electronic device may include a first housing, a second housing which is foldably coupled to the first housing through a hinge device, a flexible display disposed to be supported by the first housing and the second housing and including a folding area which is deformed in a folding state, at least one waterproof member disposed between the first housing and the flexible display and/or between the second housing and the flexible display, and at least one support structure disposed between the first housing and the flexible display and/or between the second housing and the flexible display in a periphery of the at least one waterproof member, where the at least one support structure includes a first part disposed to have a first height and a second part disposed to have a second height higher than the first height, and where at least a part of the second part is disposed at a position overlapping at least a part of at least the folding area when the flexible display is viewed from above.

According to various embodiments, an electronic device may include a first housing, a second housing which is foldably coupled to the first housing through a hinge device, a flexible display disposed to be supported by the first housing and the second housing and including a folding area which is deformed in a folding state, the flexible display including a window layer, a display panel disposed under the window layer, a support plate disposed under the display panel and including a plurality of openings in a part corresponding to the folding area, a first reinforcing plate disposed under the support plate and in a part corresponding to the first housing, and a second reinforcing plate disposed under the support plate and in a part corresponding to the second housing, at least one waterproof member disposed between the first reinforcing plate and the first housing and/or between the second reinforcing plate and the second housing, and at least one support structure disposed between the first reinforcing plate and the first housing and/or between the second reinforcing plate and the second housing in a periphery of the at least one waterproof member, where the at least one support structure includes a first part disposed to have a first height and a second part disposed to have a second height higher than the first height, and where at least a part of the second part is disposed at a position overlapping at least a part of at least the folding area when the flexible display is viewed from above.

Advantageous Effects

An electronic device according to exemplary embodiments of the disclosure may include a support structure disposed between a flexible display and housings such that a portion overlapping at least a folding area is disposed to have a larger height than remaining portions, thereby helping improve the surface quality and/or durability in the folding area, and helping improve the waterproof performance by improving the adhesiveness of the waterproof member.

Various other advantageous effects identified explicitly or implicitly through the disclosure may be provided.

DESCRIPTION OF DRAWINGS

FIG. 6A is a partial cross-sectional view of an electronic device taken along line 6a-6a of FIG. 1A according to various embodiments of the disclosure;

FIG. 6B is a cross-sectional view of an electronic device illustrating a height relationship between a waterproof member and a support structure which are compressed according to assembly of a flexible display according to various embodiments of the disclosure;

MODE FOR INVENTION

Figure 1A:
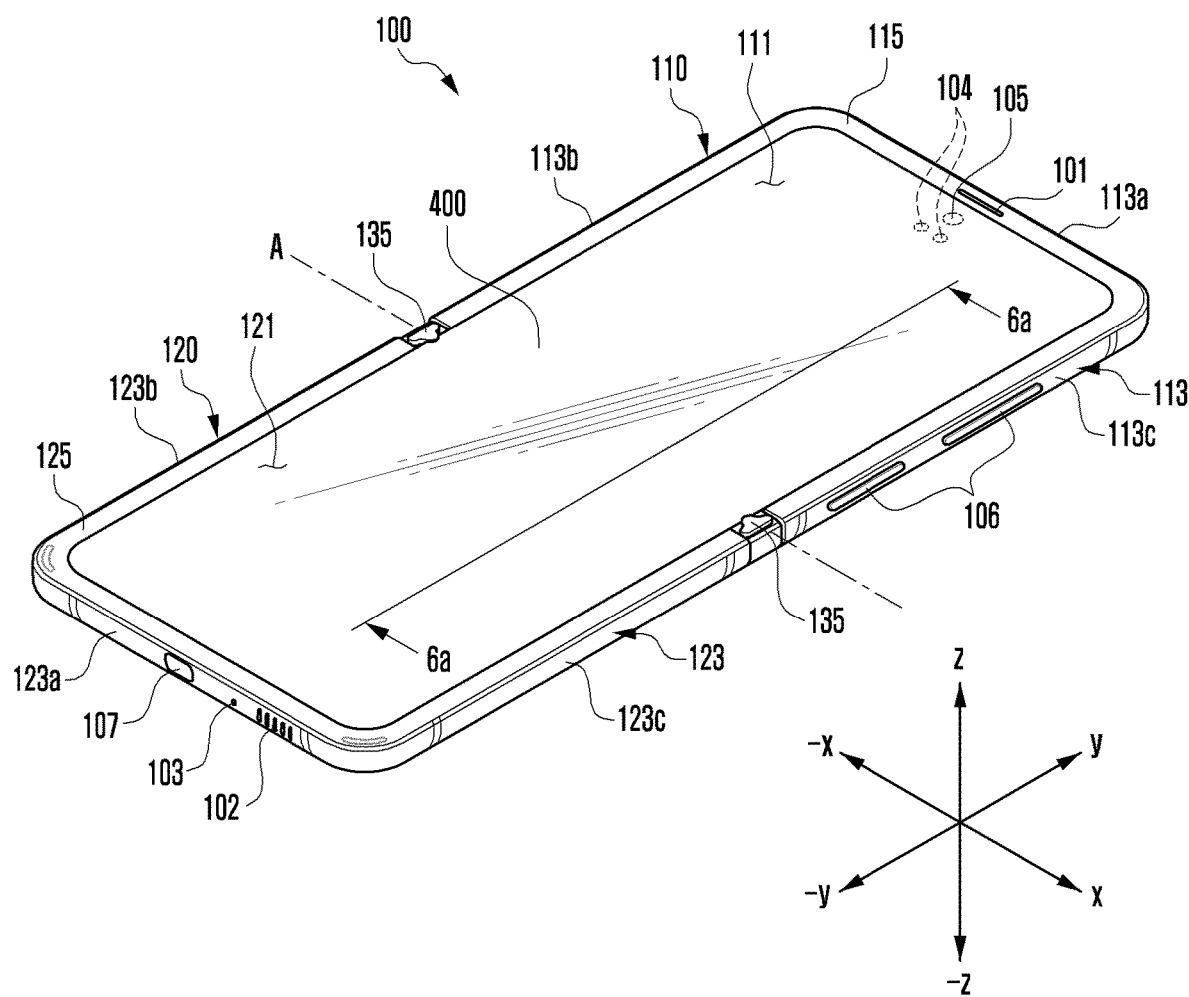
FIG. 1A is a front perspective view of an electronic device which is flat, illustrating a flat state or an unfolded state according to various embodiments of the disclosure.
Figure 1B:
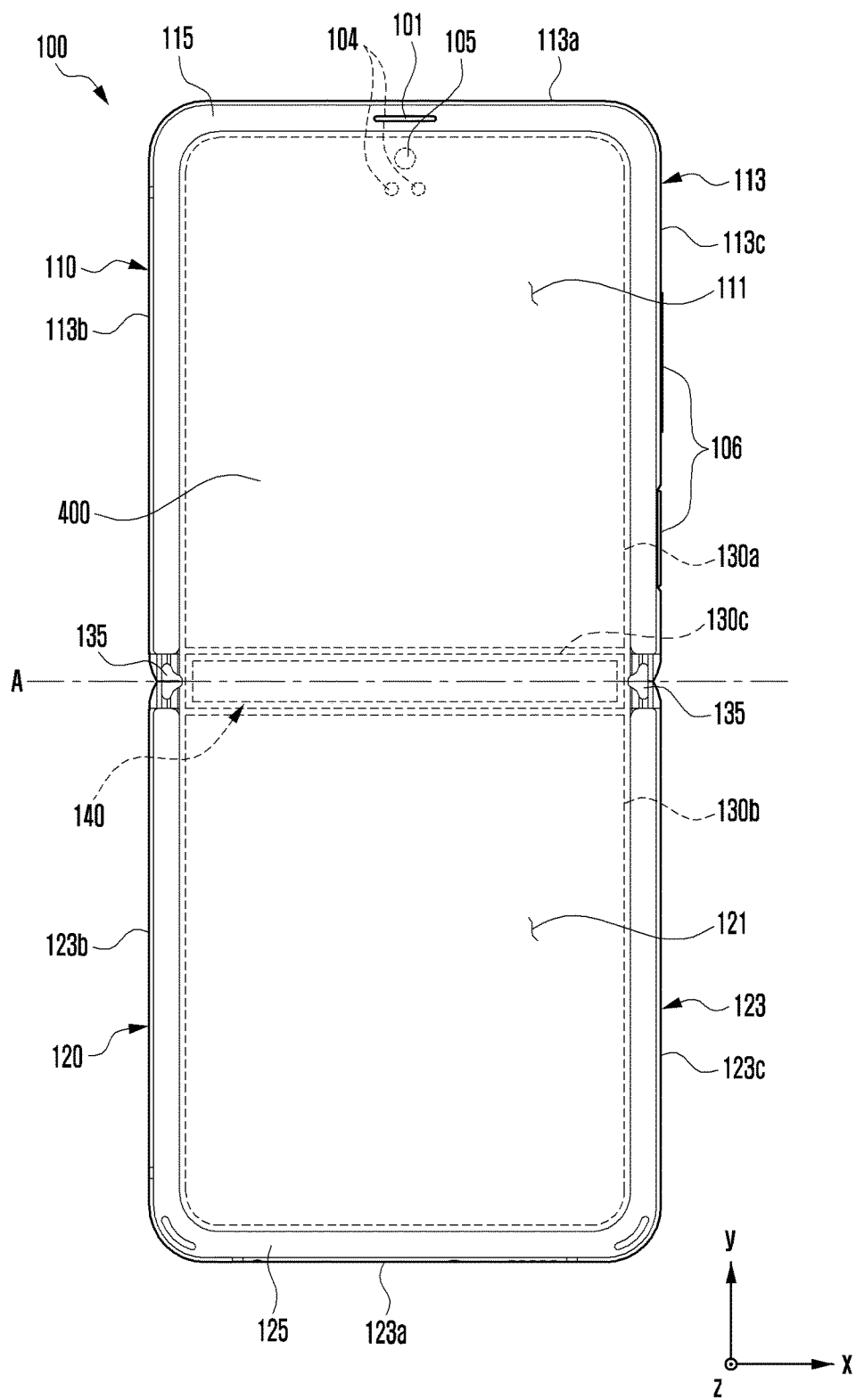
FIG. 1B is a plan view illustrating a front surface of an electronic device in a flat state according to various embodiments of the disclosure.
Figure 1C:
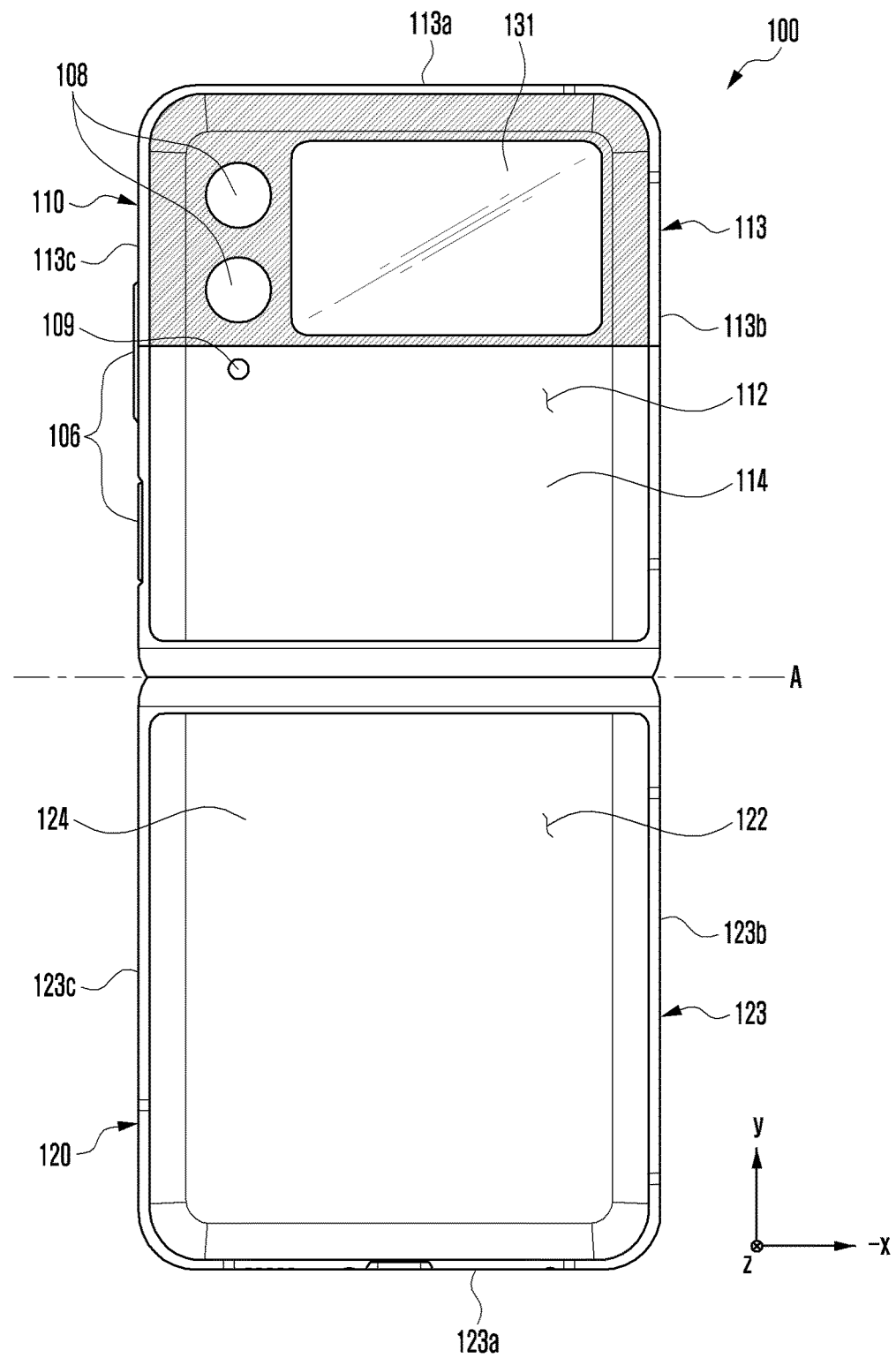
FIG. 1C is a plan view illustrating a rear surface of an electronic device in a flat state according to various embodiments of the disclosure.

FIG. 1A is a front perspective view of an electronic device in a flat or unfolded state according to certain embodiments of the disclosure. FIG. 1B is a plan view illustrating the front of the electronic device in an unfolded state according to certain embodiments of the disclosure. FIG. 1C is a plan view illustrating the back of the electronic device in an unfolded state according to certain embodiments of the disclosure.

Figure 2A:
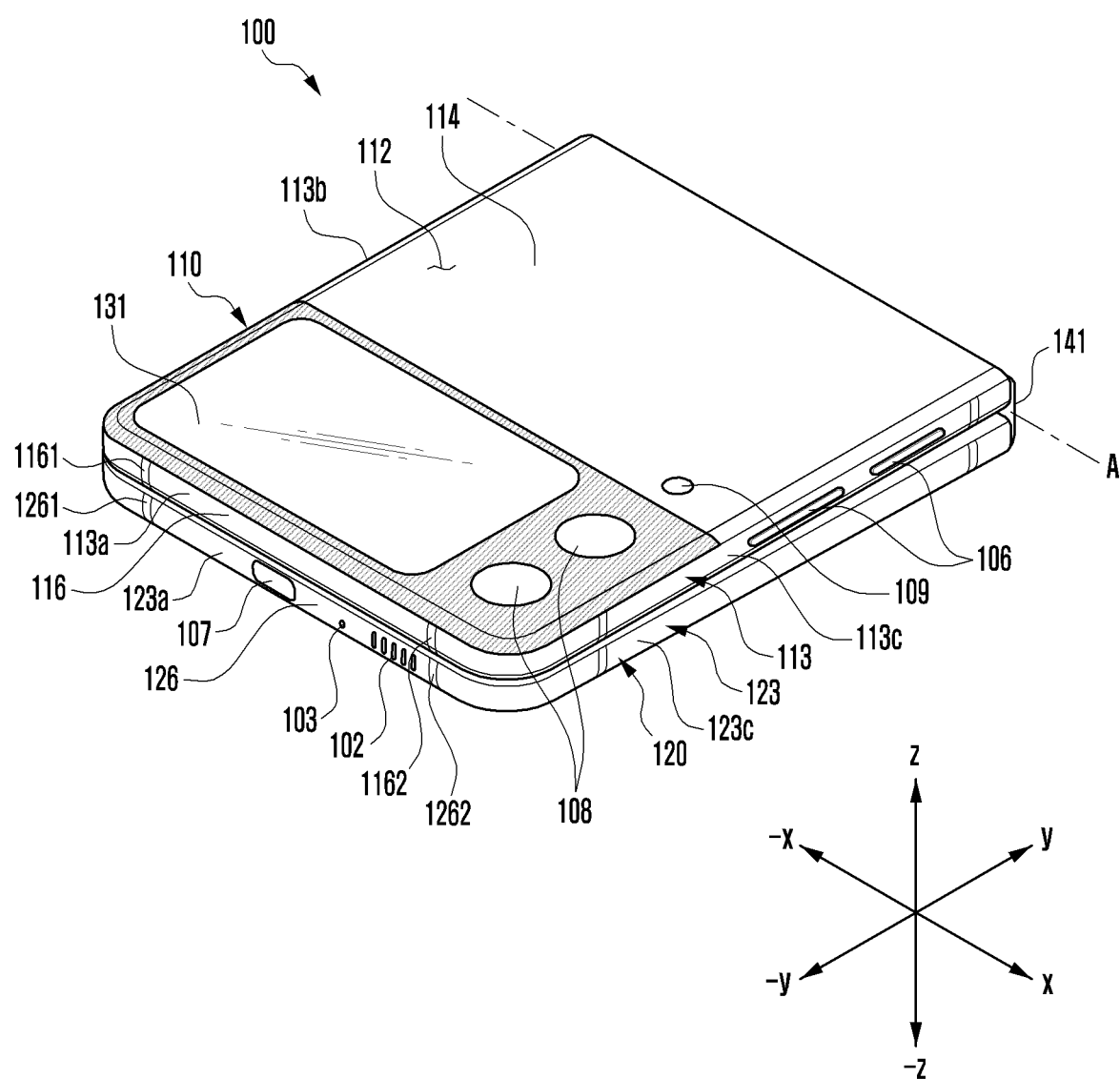
FIG. 2A is a perspective view of an electronic device which is folded, illustrating a folding state according to various embodiments of the disclosure.
Figure 2B:
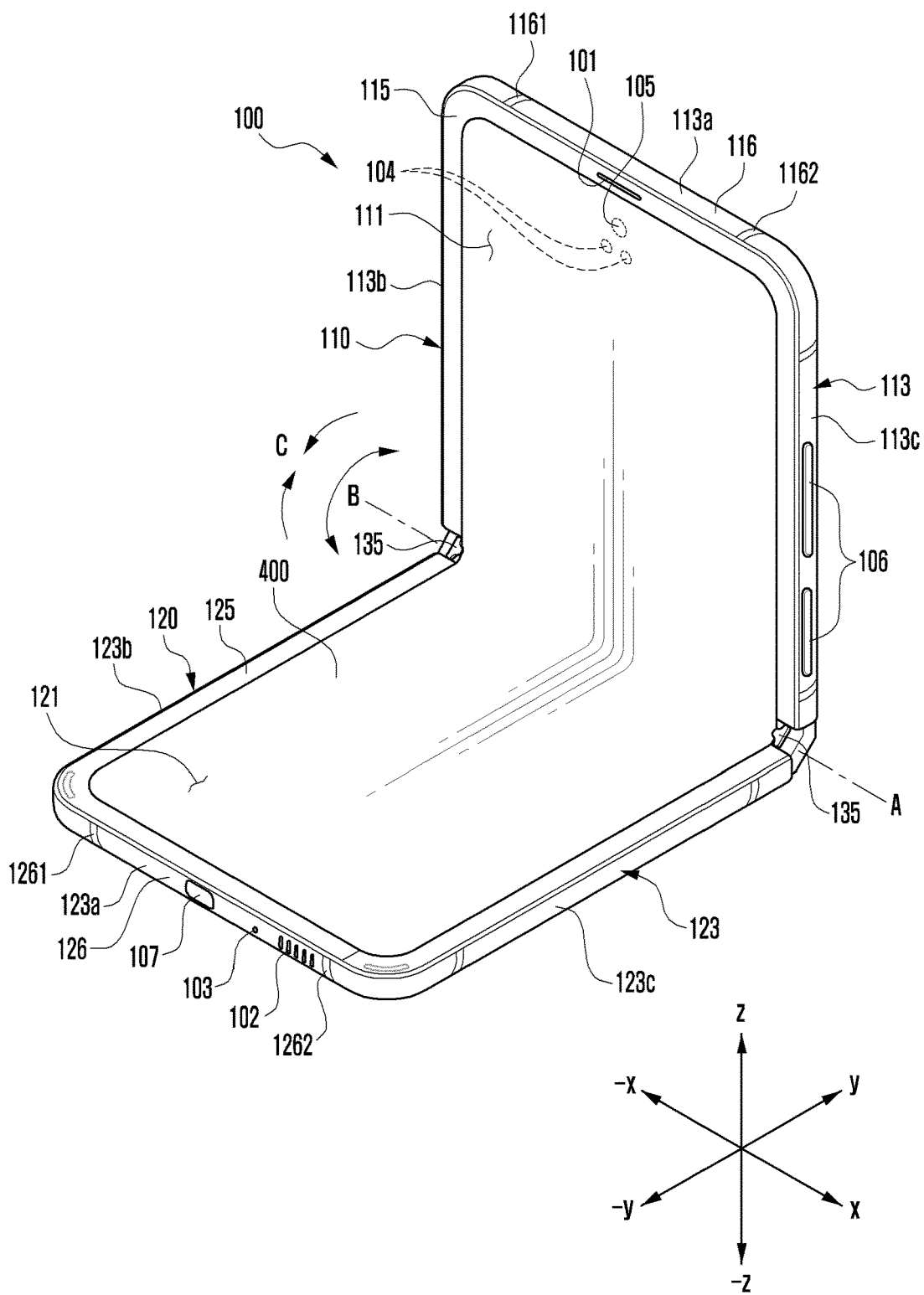
FIG. 2B is a perspective view of an electronic device which is partially folded, illustrating an intermediate state according to various embodiments of the disclosure.

FIG. 2A is a perspective view of the electronic device in a folded state according to certain embodiments of the disclosure. FIG. 2B is a perspective view of the electronic device in an intermediate state according to certain embodiments of the disclosure.

With reference to FIGS. 1A to 2B, the electronic device 100 may include a pair of housings 110 and 120 (e.g., foldable housings) that are rotatably coupled as to allow folding relative to a hinge mechanism (e.g., hinge mechanism 140 in FIG. 1B). In certain embodiments, the hinge mechanism (e.g., hinge mechanism 140 in FIG. 1B) may be disposed in the X-axis direction or in the Y-axis direction. In certain embodiments, two or more hinge mechanisms (e.g., hinge mechanism 140 in FIG. 1B) may be arranged to be folded in a same direction or in different directions. According to an embodiment, the electronic device 100 may include a flexible display 400 (e.g., foldable display) disposed in an area formed by the pair of housings 110 and 120. According to an embodiment, the first housing 110 and the second housing 120 may be disposed on both sides about the folding axis (axis A), and may have a substantially symmetrical shape with respect to the folding axis (axis A). According to an embodiment, the angle or distance between the first housing 110 and the second housing 120 may vary, depending on whether the state of the electronic device 100 is a flat or unfolded state, a folded state, or an intermediate state.

According to certain embodiments, the pair of housings 110 and 120 may include a first housing 110 (e.g., first housing structure) coupled to the hinge mechanism (e.g., hinge mechanism 140 in FIG. 1B), and a second housing 120 (e.g., second housing structure) coupled to the hinge mechanism (e.g., hinge mechanism 140 in FIG. 1B). According to an embodiment, in the unfolded state, the first housing 110 may include a first surface 111 facing a first direction (e.g., front direction) (z-axis direction), and a second surface 112 facing a second direction (e.g., rear direction) (negative z-axis direction) opposite to the first surface 111. According to an embodiment, in the unfolded state, the second housing 120 may include a third surface 121 facing the first direction (z-axis direction), and a fourth surface 122 facing the second direction (negative z-axis direction). According to an embodiment, the electronic device 100 may be operated in such a manner that the first surface 111 of the first housing 110 and the third surface 121 of the second housing 120 face substantially the same first direction (z-axis direction) in the unfolded state, and the first surface 111 and the third surface 121 face one another in the folded state. According to an embodiment, the electronic device 100 may be operated in such a manner that the second surface 112 of the first housing 110 and the fourth surface 122 of the second housing 120 face substantially the same second direction (negative z-axis direction) in the unfolded state, and the second surface 112 and the fourth surface 122 face one another in opposite directions in the folded state. For example, in the folded state, the second surface 112 may face the first direction (z-axis direction), and the fourth surface 122 may face the second direction (negative z-axis direction).

According to certain embodiments, the first housing 110 may include a first side member 113 that at least partially forms an external appearance of the electronic device 100, and a first rear cover 114 coupled to the first side member 113 that forms at least a portion of the second surface 112 of the electronic device 100. According to an embodiment, the first side member 113 may include a first side surface 113*a*, a second side surface 113*b* extending from one end of the first side surface 113*a*, and a third side surface 113*c* extending from the other end of the first side surface 113*a*. According to an embodiment, the first side member 113 may be formed in a rectangular shape (e.g., square or rectangle) through the first side surface 113*a*, second side surface 113*b*, and third side surface 113*c*.

According to certain embodiments, the second housing 120 may include a second side member 123 that at least partially forms the external appearance of the electronic device 100, and a second rear cover 124 coupled to the second side member 123, forming at least a portion of the fourth surface 122 of the electronic device 100. According to an embodiment, the second side member 123 may include a fourth side surface 123*a*, a fifth side surface 123*b* extending from one end of the fourth side surface 123*a*, and a sixth side surface 123*c* extending from the other end of the fourth side surface 123*a*. According to an embodiment, the second side member 123 may be formed in a rectangular shape through the fourth side surface 123*a*, fifth side surface 123*b*, and sixth side surface 123*c*.

According to certain embodiments, the pair of housings 110 and 120 are not limited to the shape and combinations illustrated herein, and may be implemented with a combination of other shapes or parts. For example, in certain embodiments, the first side member 113 may be integrally formed with the first rear cover 114, and the second side member 123 may be integrally formed with the second rear cover 124.

According to certain embodiments, in the unfolded state of the electronic device 100, the second side surface 113*b* of the first side member 113 and the fifth side surface 123*b* of the second side member 123 may be connected without a gap formed therebetween. According to an embodiment, in the unfolded state of the electronic device 100, the third side surface 113*c* of the first side member 113 and the sixth side surface 123*c* of the second side member 123 may be connected without a gap formed therebetween. According to an embodiment, in the unfolded state, the electronic device 100 may be configured such that the combined length of the second side surface 113*b* and the fifth side surface 123*b* is longer than the combined length of the first side surface 113*a* and/or the fourth side surface 123*a*. In addition, the combined length of the third side surface 113*c* and the sixth side surface 123*c* may be configured to be longer than the length of the first side surface 113*a* and/or the fourth side surface 123*a*.

According to certain embodiments, the first side member 113 and/or the second side member 123 may be formed of a metal, and may further include a polymer injected into the metal. According to an embodiment, the first side member 113 and/or the second side member 123 may include at least one conductive portion 116 and/or 126 electrically segmented through one or more segmenting portions 1161 and 1162 and/or segmenting 1261 and 1262, which may be formed using a polymer. In this case, the at least one conductive portion may be electrically connected to a wireless communication circuit included in the electronic device 100, and may be used as an antenna operating in at least one designated band (e.g., legacy band).

According to certain embodiments, the first rear cover 114 and/or the second rear cover 124 may be formed of, for example, coated or tinted glass, ceramic, polymer, metal (e.g., aluminum, stainless steel or "STS", or magnesium), or a combination thereof.

According to certain embodiments, the flexible display 400 may be disposed to extend from the first surface 111 of the first housing 110 across the hinge mechanism (e.g., hinge mechanism 140 in FIG. 1B) to at least a portion of the third surface 121 of the second housing 120. For example, the flexible display 400 may include a first region 130*a* substantially corresponding to the first surface 111, a second region 130*b* corresponding to the second surface 121, and a third region 130*c* (e.g., the bendable region) connecting the first region 130*a* and the second region 130*b* and corresponding to the hinge mechanism (e.g., hinge mechanism 140 in FIG. 1B). According to an embodiment, the electronic device 100 may include a first protection cover 115 (e.g., first protection frame or first decoration member) coupled along the periphery of the first housing 110. According to an embodiment, the electronic device 100 may include a second protection cover 125 (e.g., second protection frame or second decoration member) coupled along the periphery of the second housing 120. According to an embodiment, the first protection cover 115 and/or the second protection cover 125 may be formed of a metal or polymer material. According to an embodiment, the first protection cover 115 and/or the second protection cover 125 may be used as a decorative member. According to an embodiment, the flexible display 400 may be positioned such that the periphery of the first region 130*a* is interposed between the first housing 110 and the first protection cover 115. According to an embodiment, the flexible display 400 may be positioned such that the periphery of the second region 130*b* is interposed between the second housing 120 and the second protection cover 125. According to an embodiment, the flexible display 400 may be positioned such that the periphery of the flexible display 400 corresponding to a protection cap 135 is protected through the protection cap disposed in a region corresponding to the hinge mechanism (e.g., hinge mechanism 140 in FIG. 1B). Consequently, the periphery of the flexible display 400 may be substantially protected from the outside. According to an embodiment, the electronic device 100 may include a hinge housing 141 (e.g., hinge cover) that is disposed so as to support the hinge mechanism (e.g., hinge mechanism 140 in FIG. 1B). The hinge housing 141 may further be exposed to the outside when the electronic device 100 is in the folded state, and be invisible as viewed from the outside when retracted into a first space (e.g., internal space of the first housing 110) and a second space (e.g., internal space of the second housing 120) when the electronic device 100 is in the unfolded state. In certain embodiments, the flexible display 400 may be disposed to extend from at least a portion of the second surface 112 to at least a portion of the fourth surface 122. In this case, the electronic device 100 may be folded so that the flexible display 400 is exposed to the outside (out-folding scheme).

According to certain embodiments, the electronic device 100 may include a sub-display 131 disposed separately from the flexible display 400. According to an embodiment, the sub-display 131 may be disposed to be at least partially exposed on the second surface 112 of the first housing 110, and may display status information of the electronic device 100 in place of the display function of the flexible display 400 in case of the folded state. According to an embodiment, the sub-display 131 may be disposed to be visible from the outside through at least some region of the first rear cover 114. In certain embodiments, the sub-display 131 may be disposed on the fourth surface 122 of the second housing 120. In this case, the sub-display 131 may be disposed to be visible from the outside through at least some region of the second rear cover 124.

According to certain embodiments, the electronic device 100 may include at least one of an input device 103 (e.g., microphone), sound output devices 101 and 102, a sensor module 104, camera devices 105 and 108, a key input device 106, or a connector port 107. In the illustrated embodiment, the input device 103 (e.g., microphone), sound output devices 101 and 102, sensor module 104, camera devices 105 and 108, key input device 106, and connector port 107 indicate a hole or shape formed in the first housing 110 or the second housing 120, but may be defined to include a substantial electronic component (e.g., input device, sound output device, sensor module, or camera device) that is disposed inside the electronic device 100 and operated through a hole or a shape.

According to certain embodiments, the input device 103 may include at least one microphone disposed on the second housing 120. In certain embodiments, the input device 103 may include a plurality of microphones disposed to detect the direction of a sound. In certain embodiments, a plurality of microphones may be disposed at appropriate positions in the first housing 110 and/or the second housing 120. According to an embodiment, the sound output devices 101 and 102 may include speakers. According to an embodiment, the input device 103 may include a receiver for calls disposed in the first housing 110, and a speaker disposed in the second housing 120. In certain embodiments, the input device 103, the sound output devices 101 and 102, and the connector port 107 may be disposed in a space arranged in the first housing 110 and/or the second housing 120 of the electronic device 100, and may be exposed to the external environment through at least one hole formed in the first housing 110 and/or the second housing 120. According to an embodiment, at least one connector port 107 may be used to transmit and receive power and/or data to and from an external electronic device. In certain embodiments, at least one connector port (e.g., ear jack hole) may accommodate a connector (e.g., ear jack) for transmitting and receiving an audio signal to and from an external electronic device. In certain embodiments, the hole formed in the first housing 110 and/or the second housing 120 may be commonly used for the input device 103 and the sound output devices 101 and 102. In certain embodiments, the sound output devices 101 and 102 may include a speaker (e.g., piezo speaker) that operates without using a hole formed in the first housing 110 and/or the second housing 120.

According to certain embodiments, the sensor module 104 may generate an electrical signal or data value corresponding to an internal operating state of the electronic device 100 or an external environmental state. The sensor module 104 may detect an external environment, for example, through the first surface 111 of the first housing 110. In certain embodiments, the electronic device 100 may further include at least one sensor module disposed to detect an external environment through the second surface 112 of the first housing 110. According to an embodiment, the sensor module 104 (e.g., illuminance sensor) may be disposed under the flexible display 400 to detect an external environment through the flexible display 400. According to an embodiment, the sensor module 104 may include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor 104.

According to certain embodiments, the camera devices 105 and 108 may include a first camera device 105 (e.g., front camera device) disposed on the first surface 111 of the first housing 110, and a second camera device 108 disposed on the second surface 112 of the first housing 110. The electronic device 100 may further include a flash 109 disposed close to the second camera device 108. According to an embodiment, the camera device 105 or 108 may include one or more lenses, an image sensor, and/or an image signal processor. The flash 109 may include, for example, a light emitting diode or a xenon lamp. According to an embodiment, the camera devices 105 and 108 may be arranged so that two or more lenses (e.g., wide-angle lens, super-wide-angle lens, or telephoto lens) and image sensors are positioned on one surface (e.g., first surface 111, second surface 112, third surface 121, or fourth surface 122) of the electronic device 100. In certain embodiments, the camera devices 105 and 108 may include time-of-flight (TOF) lenses and/or an image sensor.

According to certain embodiments, the key input device 106 (e.g., key button) may be disposed on the third side surface 113*c* of the first side member 113 of the first housing 110. In certain embodiments, the key input device 106 may be disposed on at least one of the other side surfaces 113*a* and 113*b* of the first housing 110 and/or the side surfaces 123*a*, 123*b* and 123*c* of the second housing 120. In certain embodiments, the electronic device 100 may not include some or all of the key input devices 106, and those not included key input devices 106 may be implemented in other forms, such as soft keys, on the flexible display 400. In certain embodiments, the key input device 106 may be implemented by using a pressure sensor included in the flexible display 400.

According to certain embodiments, some of the camera devices 105 and 108 (e.g., first camera device 105) or the sensor module 104 may be disposed to be exposed through the flexible display 400. For example, the first camera device 105 or the sensor module 104 may be arranged in the internal space of the electronic device 100 so as to be in contact with the external environment through an opening (e.g., through hole) formed at least partially in the flexible display 400. In another embodiment, some sensor modules 104 may be arranged in the internal space of the electronic device 100 so as to perform their functions without being visually exposed through the flexible display 400. For example, in this case, the opening of a region of the flexible display 400 facing the sensor module may be not needed.

With reference to FIG. 2B, the electronic device 100 may be operated to remain in an intermediate state through the hinge mechanism (e.g., hinge device 140 in FIG. 1B). In this case, the electronic device 100 may control the flexible display 400 to display different pieces of content on the display area corresponding to the first surface 111 and the display area corresponding to the third surface 121. According to an embodiment, the electronic device 100 may be operated substantially in an unfolded state (e.g., unfolded state of FIG. 1A) and/or substantially in a folded state (e.g., folded state of FIG. 2A) with respect to a specific inflection angle (e.g., angle between the first housing 110 and the second housing 120 in the intermediate state) through the hinge mechanism (e.g., hinge mechanism 140 in FIG. 1B). For example, when a pressing force is applied in the unfolding direction (B direction) in a state where the electronic device 100 is unfolded at a specific inflection angle, through the hinge mechanism (e.g., hinge mechanism 140 in FIG. 1B), the electronic device 100 may be transitioned to an unfolded state (e.g., unfolded state of FIG. 1A). For example, when a pressing force is applied in the folding direction (C direction) in a state where the electronic device 100 is unfolded at a specific inflection angle, through the hinge mechanism (e.g., hinge mechanism 140 in FIG. 1B), the electronic device 100 may be transitioned to a closed state (e.g., folded state of FIG. 2A). In an embodiment, the electronic device 100 may be operated to remain in an unfolded state at various angles (not shown) through the hinge mechanism (e.g., hinge mechanism 140 in FIG. 1B).

Figure 3:
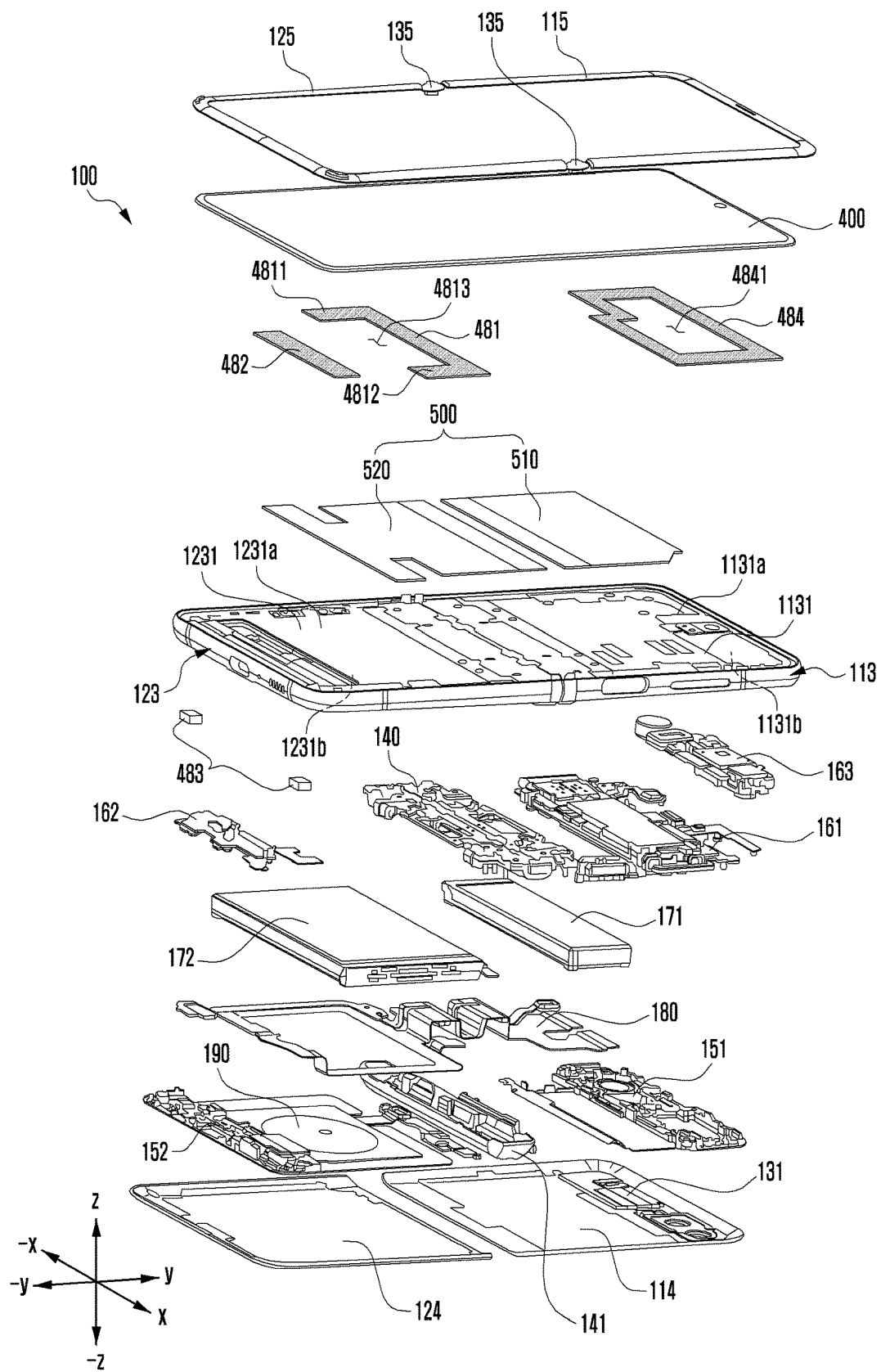
FIG. 3 is an exploded perspective view of an electronic device according to various embodiments of the disclosure.

FIG. 3 is an exploded perspective view of the electronic device according to certain embodiments of the disclosure.

With reference to FIG. 3, the electronic device 100 may include a first side member 113 (e.g., first side frame), a second side member 123 (e.g., second side frame), and a hinge mechanism 140 (e.g., hinge module) rotatably connecting the first side member 113 and the second side member 123. According to an embodiment, the electronic device 100 may include a first support member 1131 (e.g., first support member) at least partially extending from the first side member 113, and a second support member 1231 at least partially extending from the second side member 123. According to an embodiment, the first support member 1131 may be integrally formed with the first side member 113 or may be structurally coupled to the first side member 113. Similarly, the second support member 1231 may be integrally formed with the second side member 123 or may be structurally coupled to the second side member 123. According to an embodiment, the electronic device 100 may include a flexible display 400 disposed to be supported by the first support member 1131 and the second support member 1231. According to an embodiment, the electronic device 100 may include a first rear cover 114 that is coupled to the first side member 113 and provides a first space between itself and the first support member 1131, and a second rear cover 124 that is coupled to the second side member 123 and provides a second space between itself and the second support member 1231. In certain embodiments, the first side member 113 and the first rear cover 114 may be integrally formed. In certain embodiments, the second side member 123 and the second rear cover 124 may be integrally formed. According to an embodiment, the electronic device 100 may include a first housing 110 (e.g., first housing 110 in FIG. 1A) (e.g., first housing structure) provided through the first side member 113, the first support member 1131, and the first rear cover 114. According to an embodiment, the electronic device 100 may include a second housing (e.g., second housing 120 in FIG. 1A) (e.g., second housing structure) provided through the second side member 123, the second support member 1231, and the second rear cover 124. According to an embodiment, the electronic device 100 may include a sub-display 131 that is disposed to be visible from the outside through at least some region of the first rear cover 114.

According to certain embodiments, the electronic device 100 may include a first substrate assembly 161 (e.g., main printed circuit board), a camera assembly 163, a first battery 171, or a first bracket 151, arranged in the first space between the first side member 113 and the first rear cover 114. According to an embodiment, the camera assembly 163 may include a plurality of camera devices (e.g., camera devices 105 and 108 in FIGS. 1A and 2A), and may be electrically connected to the first substrate assembly 161. According to an embodiment, the first bracket 151 may provide a support structure for supporting the first substrate assembly 161 and/or the camera assembly 163, and improved rigidity. According to an embodiment, the electronic device 100 may include a second board assembly 162 (e.g., sub printed circuit board), an antenna 190 (e.g., coil member), a second battery 172, or a second bracket 152, arranged in the second space between the second side member 123 and the second rear cover 124. According to an embodiment, the electronic device 100 may include a wiring member 180 (e.g., FPCB) extending from the first substrate assembly 161 across the hinge mechanism 140 to a plurality of electronic components arranged between the second side member 123 and the second rear cover 124, to provide electrical connections therebetween. According to an embodiment, the antenna 190 may include a near field communication (NFC) antenna, a wireless charging antenna, and/or a magnetic secure transmission (MST) antenna. The antenna 190 may, for example, perform short-range communication with an external device or wirelessly transmit and receive power utilized for charging.

According to certain embodiments, the electronic device 100 may include a hinge housing 141 (e.g., hinge cover) that supports the hinge mechanism 140 and is disposed so as to be exposed to the outside when the electronic device 100 is in the folded state (e.g., folded state of FIG. 2A) and be invisible from the outside by being retracted into the first space and/or the second space when the electronic device 100 is in the unfolded state (e.g., unfolded state of FIG. 1A).

According to certain embodiments, the electronic device 100 may include a first protection cover 115 coupled along the periphery of the first side member 113. According to an embodiment, the electronic device 100 may include a second protection cover 125 coupled along the periphery of the second side member 123. According to an embodiment, in the flexible display 400, the periphery of a first flat portion (e.g., first flat portion 130a in FIG. 1B) may be protected by the first protection cover 115. According to an embodiment, in the flexible display 400, the periphery of a second flat portion (e.g., second flat portion 130b in FIG. 1B) may be protected by the second protection cover 125. According to an embodiment, the electronic device 100 may include a protection cap 135 that protects the periphery of the third region (e.g., third region 130c in FIG. 1B) of the flexible display 400 corresponding to the hinge mechanism 140.

According to certain embodiments, the first support member 1131 may include a first support surface 1131a facing a first direction (z-axis direction), and a second support surface 1131b facing a second direction (negative z-axis direction) opposite to the first direction. According to an embodiment, the second support member 1231 may include a third support surface 1231a facing the first direction, and a fourth support surface 1231b facing the second direction in the unfolded state. According to an embodiment, the flexible display 400 may be supported by the first support surface 1131a of the first support member 1131 and the third support surface 1231a of the second support member 1231.

According to certain embodiments, the flexible display 400 may include a bending part (e.g., a bending part 432 in FIG. 4) which includes an extension part (e.g., an extension part 4321 in FIG. 4) extending from a display panel (e.g., the display panel 430 in FIG. 4) and a flexible substrate (e.g., the flexible substrate 4322 in FIG. 4) (e.g., a flexible printed circuit board FPCB)) connected to the extension part 4321. As shown, the bending part 432 may be bent in a second direction (the −z-axis direction) from the flexible display, and may be disposed so as to be attached to the rear surface (e.g., the rear surface of the polarizer (POL) 420 in FIG. 4) of the flexible display 400. According to an embodiment, the bending part 432 may include a control circuit (e.g., a display driver IC (DDI) (e.g., a control circuit 4321a in FIG. 4) configured to control driving of a flexible display, and other multiple electrical elements (e.g., electrical elements 4322a in FIG. 5A).

According to certain embodiments, the electronic device 100 may include at least one waterproof member 481, 482, 483, or 484 disposed between the flexible display 400 and the second support member 1231 and between the flexible display 400 and the first support member 1131. As shown, some waterproof members 481, 482, and 483 among at least one waterproof member 481, 482, 483, or 484 may include a first waterproof member 481 disposed to at least partially surround the bending part 432 between the flexible display 400 and the second support member 1231, a second waterproof member 482 disposed between the extension part (e.g., the extension part 4321 in FIG. 4) and the second support member 1231, and third waterproof members 483 connecting one end 4811 of the first waterproof member 481 to one end of the second waterproof member 482 and connecting the other end 4812 of the first waterproof member 481 to the other end of the second waterproof member 482. According to an embodiment, at least one waterproof member 484 may also include a fourth waterproof member 484 which has a closed loop shape and is disposed between the flexible display 400 and the first support member 1131. According to an embodiment, the control circuit (e.g., the control circuit 4321a in FIG. 4) and multiple electrical elements (e.g., electrical elements 4322a in FIG. 5A), disposed in the bending part 432, may be disposed in a sealed first waterproof space 4813 formed through the first waterproof member 481, the second waterproof member 482, and the third waterproof members 483 between the flexible display 400 and the second support member 1231, and thus may be protected from external water and/or foreign matter. According to an embodiment, at least one electronic component (e.g., a sensor module (e.g., the sensor module 104 in FIG. 1A) and/or a camera device (e.g., the camera device 105 in FIG. 1A)) disposed through the first support member 1131 may be disposed in a second waterproof space 4841 formed by the closed loop shape of the fourth waterproof member 484 between the flexible display 400 and the first support member 1131, and thus may be protected from external water and/or foreign matter.

According to an embodiment, at least one electronic component (e.g., a sensor module (e.g., the sensor module 104 of FIG. 1A) and/or a camera device (e.g., the camera device 105 of FIG. 1A) disposed through a first support member 1131 may be disposed between a flexible display 400 and the first support member 1131 and in a second waterproof space 4841 formed by a closed loop shape of a fourth waterproof member 484, and thus protected from external moisture and/or foreign substances. There is no limitation on the type of components disposed in a first waterproof space 4813 and/or the second waterproof space 4841 according to various embodiments.

According to various embodiments, an electronic device 100 may include a flexible display 400, and at least one support structure 500 (e.g., a support structure, a support member, or a support plate) disposed between a first housing 110 and a second housing 120. According to an embodiment, the at least one support structure 500 may include a first member 510 disposed between the flexible display 400 and the first housing 110, and a second member 520 disposed between the flexible display 400 and the second housing 120. In some embodiments, the first member 510 and the second member 520 may be integrally configured. As will be described later, the first member 510 and/or the second member 520 may include parts (or portions) having different heights (e.g., thicknesses). For example, in the at least one support structure 500, the height of a part (e.g., a second part 512 and/or a fourth part 522 of FIG. 5B) corresponding to at least a folding area (e.g., the third area 130c of FIG. 1B) of the electronic device 100 may be configured to be higher than the height of a peripheral part (e.g., a first part 511 and/or a third part 521 of FIG. 5B). Through such a stepped structure of the support structure 500, the flexible display 400 is strongly supported in the folding area (e.g., the third area 130c of FIG. 1B), so that durability can be increased and surface quality can be improved. In addition, the periphery of waterproof members 481 and 483 has a relatively low height (e.g., has a thickness equal to or thinner than that of a compressed waterproof member), so that the waterproof members 481 and 483 may help improve waterproof performance by inducing smooth attachment between the flexible display 400 and the housings 110 and 120.

Figure 4:
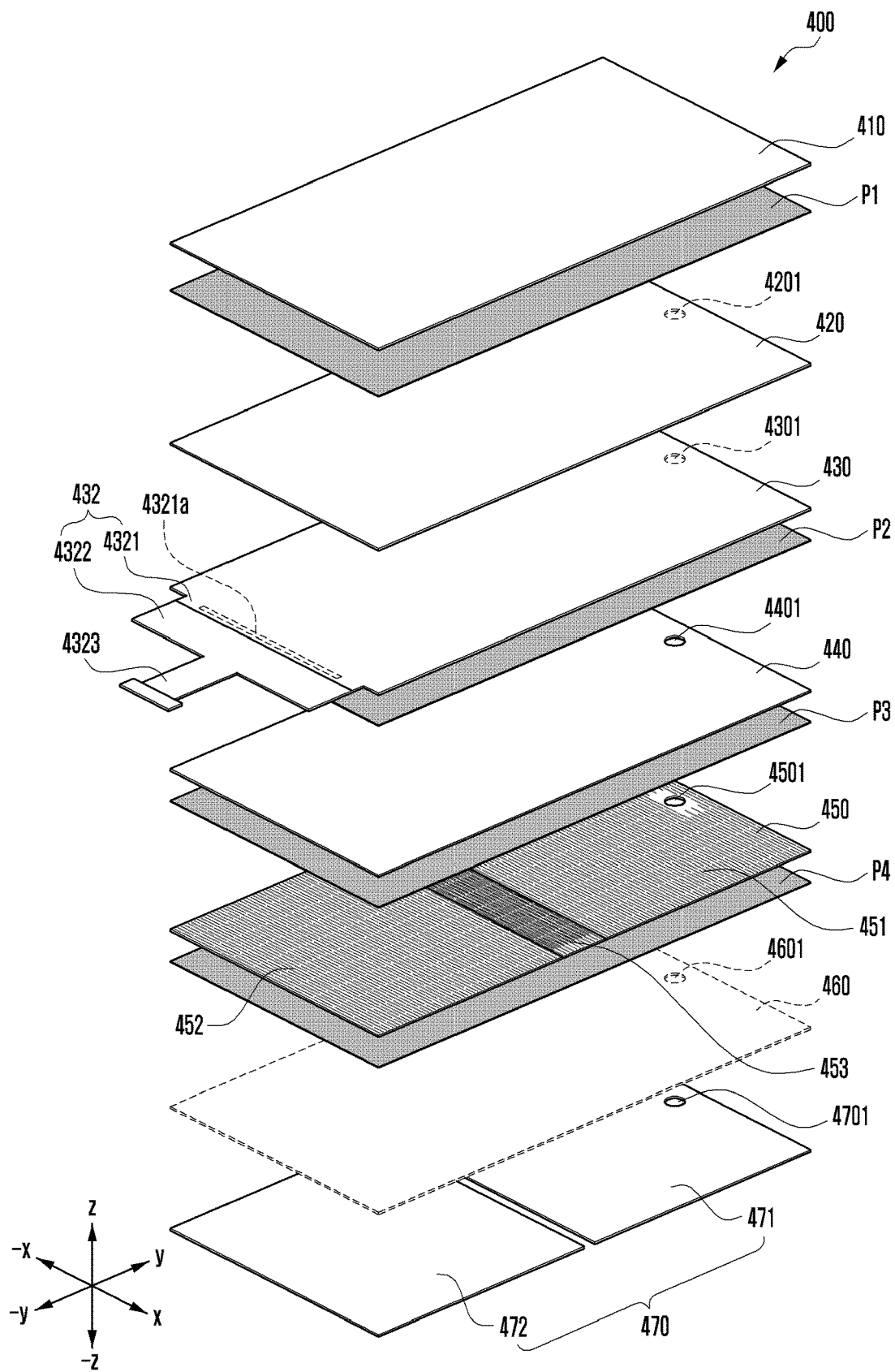
FIG. 4 is an exploded perspective view of a flexible display according to various embodiments of the disclosure.

FIG. 4 is an exploded perspective view of a flexible display according to various embodiments of the disclosure.

A display (e.g., the flexible display 400) according to exemplary embodiments of the disclosure may include an unbreakable (UB) type OLED display (e.g., a curvable (or curved) display). However, the disclosure is not limited thereto, and the flexible display 400 may include an on cell touch (OCTA) active matrix organic light-emitting diode (AMOLED) type flat-type display.

Referring to FIG. 4, the flexible display 400 may include a window layer 410, and a polarizing layer (polarizer, POL) 420 (e.g., a polarizing film), a display panel 430, a polymer layer 440, a support plate 450, and a reinforcing plate 470 which are sequentially disposed on a rear surface of the window layer 410 which is closest to the reinforcing plate 470. In some embodiments, the flexible display 400 may include a digitizer 460 disposed between the polymer layer 440 and the support plate 450 or between the support plate 450 and the reinforcing plate 470.

According to various embodiments, the window layer 410 may include a glass layer. According to an embodiment, the window layer 410 may include ultra-thin glass (UTG). In some embodiments, the window layer 410 may include a polymer. In this case, the window layer 410 may include polyethylene terephthalate (PET) or polyimide (PI). In some embodiments, the window layer 410 may be disposed in multiple layers so as to include a glass layer and a polymer.

According to various embodiments, the window layer 410, the polarizing layer 420, the display panel 430, the polymer layer 440, and the support plate 450 may be disposed to cross at least a part of a first surface (e.g., the first surface 111 of FIG. 1A) of a first housing (e.g., the first housing 110 of FIG. 1A) and a third surface (e.g., the third surface 121 of FIG. 1A) of a second housing (e.g., the second housing 120 of FIG. 1A). According to an embodiment, the reinforcing plate 470 may include a first reinforcing plate 471 facing the first housing (e.g., the first housing 110 of FIG. 1A) and a second reinforcing plate 472 facing the second housing (e.g., the second housing 120 of FIG. 1A). According to an embodiment, the window layer 410, the polarizing layer 420, the display panel 430, the polymer layer 440, the support plate 450, and the reinforcing plate 470 may be attached to each other through sticking agents P1, P2, P3, and P4 (or adhesives). For example, the sticking agents P1, P2, P3, and P4 may include at least one of an optical clear adhesive (OCA), a pressure sensitive adhesive (PSA), a heat-reactive adhesive, a general adhesive, or a double-sided tape.

According to various embodiments, the display panel 430 may include a plurality of pixels and a wiring structure (e.g., an electrode pattern). According to an embodiment, the polarizing layer 420 may selectively pass light generated from a light source of the display panel 430 and vibrating in a predetermined direction. According to an embodiment, the display panel 430 and the polarizing layer 420 may be integrally configured. According to an embodiment, the flexible display 400 may include a touch panel (not shown).

According to various embodiments, the polymer layer 440 may be disposed under the display panel 430 to provide a dark background for securing visibility of the display panel 430 and may be formed of (or include) a buffer material for a buffering action. In some embodiments, for waterproofing of the flexible display 400, the polymer layer 440 may be removed or disposed under the support plate 450.

According to various embodiments, the support plate 450 may provide a bending characteristic to the flexible display 400. For example, the support plate 450 may be formed of (or include) a non-metal sheet material such as fiber reinforced plastics (FRP) (e.g., carbon fiber reinforced plastics (CFRP) or glass fiber reinforced plastics (GFRP)) having rigid properties for supporting the display panel 430. According to an embodiment, the support plate 450 may include a first flat portion 451 corresponding to the first housing (e.g., the first housing 110 of FIG. 1A), a second flat portion 452 corresponding to the second housing (e.g., the second housing 120 of FIG. 1A), and a bending portion 453 (a flexible portion or bending portion) (e.g., a bendable portion) which connects the first flat portion 451 and the second flat portion 452 to each other. The electronic device and various components and layers thereof may be bendable at respective areas thereof corresponding to the bending portion 453, and may be bendable together with each other, without being limited thereto.

According to an embodiment, the bending portion 453 may include (or define) a plurality of openings extending completely through a thickness of the support plate 450 (or recesses which extend partially into a thickness of the support plate 450 and are open at an upper or lower surface of the support plate 450), arranged at a predetermined interval. According to an embodiment, the bending characteristic of the bending portion 453 may be determined based on at least one of a size, a shape, and an arrangement density of at least a part of the plurality of openings.

In an embodiment, the support plate 450 may be formed of steel use stainless (SUS) (e.g., stainless steel (STS)), Cu, Al, or a metal CLAD (e.g., a stacked member in which SUS and Al are alternately disposed). In this case, the plurality of openings may be configured through the entire area of the support plate 450 so that a detection operation of the digitizer 460 disposed under the support plate 450 is induced. According to an embodiment, the support plate 450 may help reinforce the stiffness of an electronic device (e.g., the electronic device 100 of FIG. 1A), and may be used to shield ambient noise and dissipate heat emitted from a surrounding heat emission component.

According to various embodiments, the display 400 may include the digitizer 460 as a detection member which is disposed under the support plate 450 and receives an input (e.g., external input) of an input tool such as an electronic pen (e.g., a stylus). For example, the digitizer 460 may include a coil member disposed on a dielectric substrate to detect a resonance frequency of an electromagnetic induction scheme applied from the electronic pen.

According to various embodiments, the flexible display 400 may include at least one functional member (not shown) disposed between the polymer layer 440 and the support plate 450 (e.g., disposed above the support plate 450), or disposed under the support plate 450. According to an embodiment, the functional member which provides a function to the electronic device may include a graphite sheet for a function of heat dissipation, an added display for a function of image display, a force touch FPCB for a function of detecting a contact or touch from an input tool, a fingerprint sensor FPCB for a function of capturing a fingerprint, an antenna radiator for a function of communication, or a conductive/non-conductive tape. According to an embodiment, in the case where the functional member is not bendable, the functional member may be separately disposed in the first housing (e.g., the first housing 110 of FIG. 1A) and the second housing (e.g., the second housing 120 of FIG. 1A). According to an embodiment, in the case where the functional member is bendable, the functional member may be disposed from the first housing (e.g., the first housing 110 of FIG. 1A) and out of the first housing and up to at least a part of the second housing (e.g., the second housing 120 of FIG. 1A) through a hinge device (e.g., the hinge device 140 of FIG. 1B).

According to various embodiments, an electronic device (e.g., the electronic device 100 of FIG. 1A) may include a camera device (e.g., the first camera device 105 of FIG. 1A) disposed under the flexible display 400 and configured to detect an external environment of the electronic device through the flexible display 400. In some embodiments, the electronic device (e.g., the electronic device 100 of FIG. 1A) may include at least one sensor module (e.g., the sensor module 104 of FIG. 1A) (e.g., an illuminance sensor, a proximity sensor, or a TOF sensor) disposed under the flexible display 400. According to an embodiment, the polarizing layer 420, the display panel 430, the polymer layer 440, the support plate 450, and the reinforcing plate 470 may include through-holes 4201, 4301, 4401, 4501, 4601, and 4701. In some embodiments, the display panel 430 and/or the polarizing layer 420 may not need the through-holes 4201 and 4301 by adjusting the transmittance of a corresponding area. In some embodiments, the sizes of the through-holes 4201, 4301, 4401, 4501, 4601, and 4701 (e.g., a planar size taken along a plane defined by a first direction like an X-axis direction and a second direction like a Y-axis direction) may be configured based on the size of the camera device (e.g., the first camera device 105 of FIG. 1A) and/or an angle of view of the camera device (e.g., the first camera device 105 of FIG. 1A), and the through-holes 4201, 4301, 4401, 4501, 4601, and 4701 may have different sizes from each other. Various through-holes among the through-holes 4201, 4301, 4401, 4501, 4601, and 4701 may be aligned with each other, without being limited thereto.

According to various embodiments, the flexible display 400 may include a bending portion 432 which is bendable such that a portion of the display panel 430 may face a partial area of a rear surface of the flexible display 400. That is, the flexible display 400 which is bent at the bending portion 432 may dispose a portion of the display panel 430 facing the rear surface of the flexible display 400. According to an embodiment, the bending portion 432 may include an extension portion 4321 extending from the display panel 430 and including a control circuit 4321a, and a flexible substrate 4322 electrically connected to the extension portion 4321 and including a plurality of electrical elements.

According to an embodiment, the control circuit 4321a may include a display driver IC (DDI) or a touch display driver IC (TDDI) mounted on the extension portion 4321 having an electrical wiring structure. According to an embodiment, the control circuit 4321a may have a chip on panel or chip on plastic (COP) structure directly disposed on the extension portion 4321. In some embodiments, the control circuit may have a chip on film (COF) structure mounted on a separate connection film (not shown) connecting the extension portion 4321 and the flexible substrate 4322.

According to an embodiment, the flexible display 400 may include a plurality of electrical elements 4322a arranged on the flexible substrate 4322. According to an embodiment, the flexible display 400 may include a connector portion 4323 extending from the flexible substrate 4322 and electrically connected to a substrate (e.g., the second printed circuit board 162 of FIG. 3) of an electronic device (e.g., the electronic device 100 of FIG. 3). According to an embodiment, the plurality of electrical elements 4322a may include a touch IC, a flash memory for a display, a diode for preventing ESD, a pressure sensor, or a passive element such as a decap. In another embodiment, when the bending portion 432 is disposed in an area facing the first housing (e.g., the first housing 110 of FIG. 1) of the flexible display 400 in the flexible display 400 which is bent at the bending portion 432, the connector portion 4323 may be electrically connected to another substrate (e.g., the first printed circuit board 161 of FIG. 3) of the electronic device (e.g., the electronic device 100 of FIG. 3).

Figure 5A:
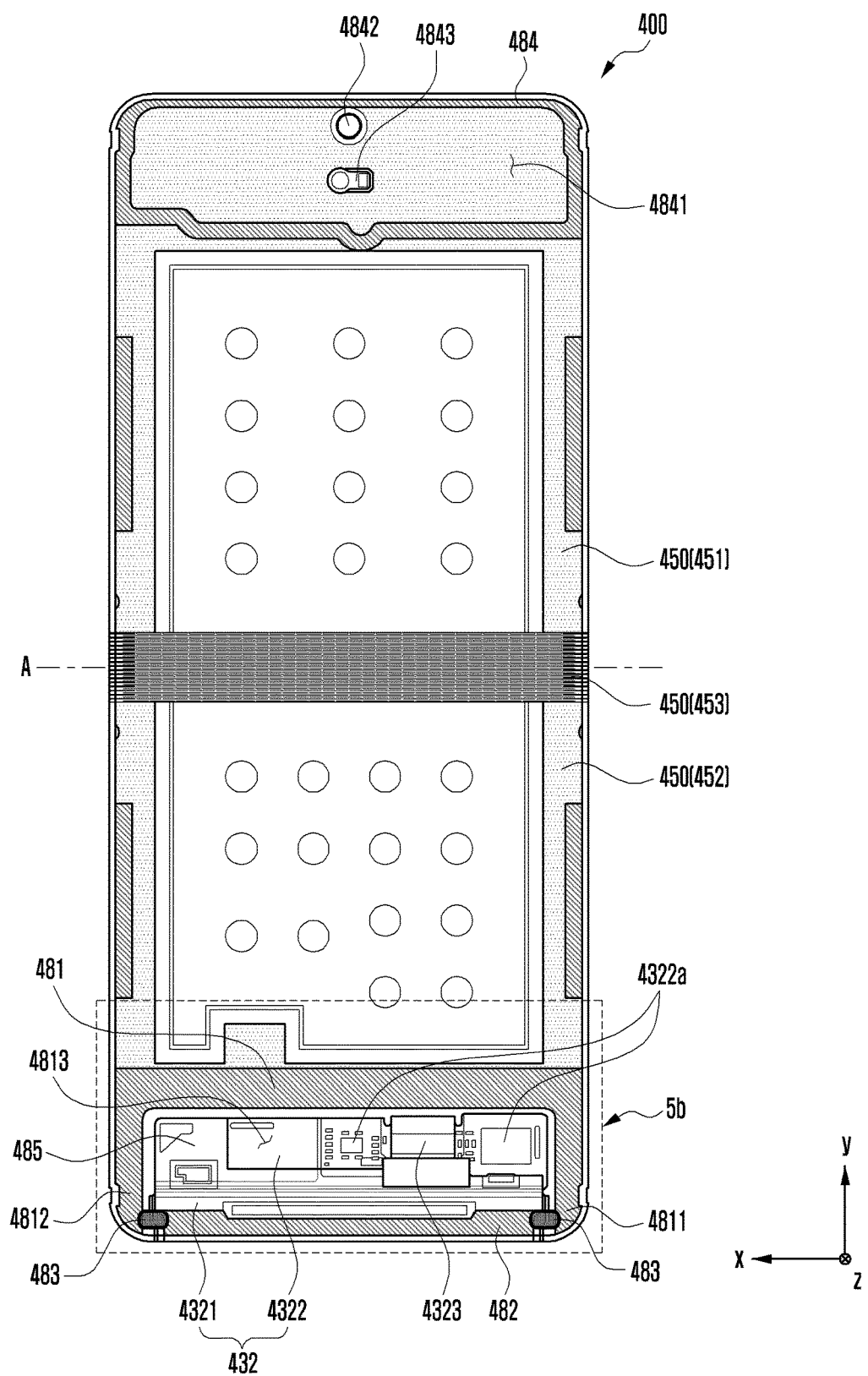
FIG. 5A is a plan view of illustrating a rear surface of a flexible display according to various embodiments of the disclosure.
Figure 5B:
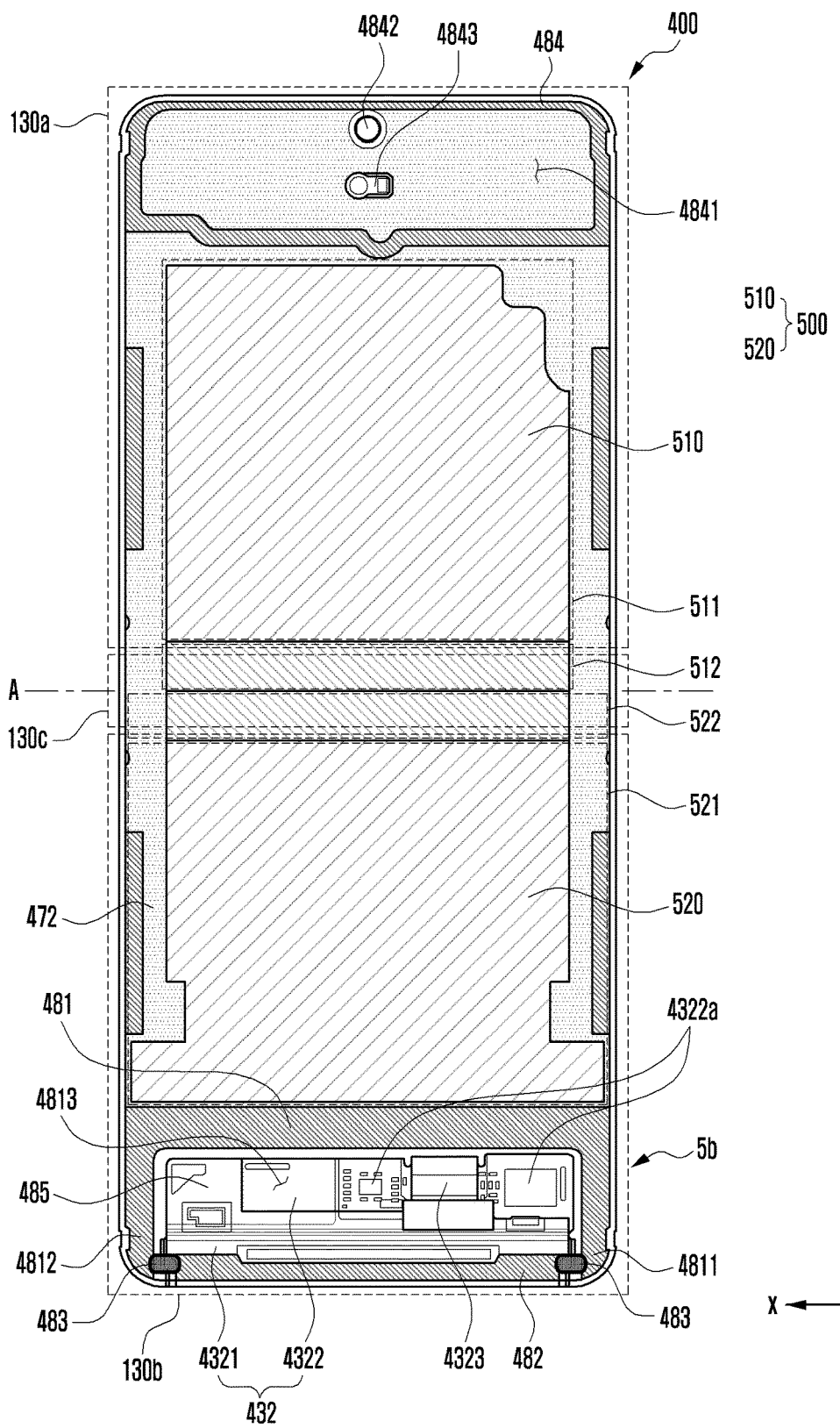
FIG. 5B is a view illustrating a state in which a support structure is disposed on the rear surface of the flexible display of FIG. 5A according to various embodiments of the disclosure.

FIG. 5A is a plan view of illustrating a rear surface of a flexible display according to various embodiments of the disclosure. FIG. 5B is a view illustrating a state in which a support structure is disposed on the rear surface of the flexible display of FIG. 5A according to various embodiments of the disclosure.

Referring to FIGS. 5A and 5B, an electronic device (e.g., the electronic device 100 of FIG. 6A) may include a flexible display 400 disposed to be supported by a first support member (e.g., the first support member 1131 of FIG. 3) of a first housing 110 and a second support member (e.g., a second support member 1231 of FIG. 3) of a second housing 120. According to an embodiment, the flexible display 400 may include a bending portion 432 extending outward from a display panel (e.g., the display panel 430 of FIG. 4) and disposed on a rear surface of the flexible display 400. According to an embodiment, the bending portion 432 may include an extension portion 4321 extending from the display panel (e.g., the display panel 430 of FIG. 4) and including a control circuit (e.g., the control circuit 4321a of FIG. 4), and a flexible substrate 4322 connected to the extension portion 4321 and including a plurality of electrical elements 4322a. According to an embodiment, the bending portion 432 may be bent to the rear surface of the flexible display 400 and then attached to a rear surface of a second reinforcing plate 472 attached to a support plate 450. In some embodiments, the ground of the flexible substrate 4322 may be electrically connected to the second reinforcing plate 472 formed of a conductive material, thereby helping to prevent malfunction (e.g., flicker phenomenon) of the flexible display 400.

According to various embodiments, the bending portion 432 which is bent may be disposed to face at least a part of the second reinforcing plate 472 in an area at least partially corresponding to the second housing 120. In this case, the corresponding part of the second housing 120 may include a recess formed to be lower than the outer surface of the second housing in order to receive the bending portion 432. In some embodiments, the bending portion 432 may be disposed to face a first reinforcing plate 471 in an area at least partially corresponding to the first housing 110. In some embodiments, the bending portion 432 may correspond to at least a part of the second housing 120 and may be disposed in such a manner of being attached to a second flat portion 452 of the support plate 450, in an area where the second reinforcing plate 472 is partially omitted. In this case, the ground of the flexible substrate 4322 may be electrically connected to the support plate 450 formed of a conductive material. In some embodiments, the bending portion 432 may correspond to at least a part of the first housing 110 and may be attached to a first flat portion 451 of the support plate 450, in an area where the first reinforcing plate 471 is partially omitted. In this case, the ground of the flexible substrate 4322 may be electrically connected to the support plate 450 formed of a conductive material.

According to various embodiments, the electronic device (e.g., the electronic device 100 of FIG. 6A) may include at least one waterproof member 481, 482, 483, and 484 which provides a waterproofing function (e.g., a waterproofing member). According to an embodiment, the at least one waterproof member 481, 482, 483, and 484 may include a first waterproof member 481 disposed between the second reinforcing plate 472 and the second housing (e.g., the second housing 120 of FIG. 6A) to substantially surround the bending portion 432, and a second waterproof member 482 disposed between the extension portion 4321 and the second housing 120. According to an embodiment, the at least one waterproof member may include a third waterproof member 483 which connects one end 4811 of the first waterproof member 481 and one end of the second waterproof member 482 (e.g., to each other), and connects the other end 4812 of the first waterproof member 481 and the other end of the second waterproof member 482 (e.g., to each other). According to an embodiment, the first waterproof member 481 and the second waterproof member 482 may include at least one of a tape, an adhesive, a waterproof dispensing, silicone, a waterproof rubber, and urethane.

According to an embodiment, when the first waterproof member 481 and the second waterproof member 482 are integrally configured (e.g., into a single body), moisture or foreign substances may be introduced into a gap formed by a height difference (step difference) between the bending portion 432 and the second reinforcing plate 472.

According to an embodiment, the first waterproof member 481 may be attached in a separated state from the second waterproof member 482 so as to be spaced apart from the second waterproof member 482 by a specified interval in the above-described stepped part, and the stepped part including the corresponding interval may be connected without a gap, through the third waterproof member 483. In some embodiments, in a state in which the first waterproof member 481 and the second waterproof member 482 are integrally configured, the third waterproof member 483 may be applied to an area corresponding to the gap formed by a height difference between the bending portion 432 and the second reinforcing plate 472. According to an embodiment, the third waterproof member 483 may include a waterproofing filling member including semi-solid or liquid substances and having a property of being solidified by natural or external conditions (e.g., heat, ultraviolet rays, or pressure). Accordingly, the control circuit 4321a and the plurality of electrical elements 4322a may be configured between the second housing 120 and the second reinforcing plate 472 of the flexible display 400 through the first waterproof member 481, the second waterproof member 482, and the third waterproof member 483, and disposed in a first waterproof space 4813 having a closed loop type without a discontinuous section due to a stepped structure, and thus can be protected from moisture and/or foreign substances penetrating from the outside.

According to various embodiments, the electronic device (e.g., the electronic device 100 of FIG. 6A) may include a fourth waterproof member 484 having a closed loop shape and disposed between the first housing (e.g., the first housing 110 of FIG. 6A) and the first reinforcing plate 471 of the flexible display 400. According to an embodiment, the fourth waterproof member 484 may provide a sealed second waterproof space 4841. According to an embodiment, the electronic device (e.g., the electronic device 100 of FIG. 6A) may include at least one electronic component disposed in a first arrangement area 4842 and a second arrangement area 4843 provided in at least a partial area of the second waterproof space 4841. According to an embodiment, the at least one electronic component may include a camera device (e.g., the camera device 105 of FIG. 1A) disposed in the first arrangement area 4842 and a sensor module (e.g., the sensor module 104 of FIG. 1A) disposed in the second arrangement area 4843. Therefore, the at least one electronic component may be disposed in the second waterproof space 4841 configured to be sealed by the first housing 110, the fourth waterproof member 484, and the first reinforcing plate 471 of the flexible display 400 (e.g., the first housing 110 together with the fourth waterproof member 484, and the first reinforcing plate 471), and thus can be protected from external moisture and/or foreign substances.

According to various embodiments, the electronic device (e.g., the electronic device 100 of FIG. 6A) may include the flexible display 400, and at least one support structure 500 disposed between the first housing (e.g., the first housing 110 of FIG. 6A) and the second housing (e.g., the second housing 120 of FIG. 6A). According to an embodiment, the at least one support structure 500 may include a first member 510 disposed between the first reinforcing plate 471 and the first housing 110, and a second member 520 disposed between the second reinforcing plate 472 and the second housing 120. According to an embodiment, the first member 510 may include a first part 511 at least partially corresponding to a first area 130a of the flexible display 400 and disposed up to the vicinity of the fourth waterproof member 484, and a second part 512 connected to the first part 511 and disposed to at least partially correspond to a third area 130c (e.g., a folding area). According to an embodiment, the second member 520 may include a third part 521 at least partially corresponding to a second area 130b of the flexible display 400 and disposed up to the vicinity of the first waterproof member 481, and a fourth part 522 connected to the third part 521 and disposed to at least partially correspond to the third area 130c (e.g., a folding area). According to an embodiment, the height of the second part 512 may be higher than the height of the first part 511. According to an embodiment, the height of the fourth part 522 may be higher than the height of the third part 521. According to an embodiment, the first part 511 and the third part 521 may be configured to have substantially the same height. According to an embodiment, the second part 512 and the fourth part 522 may be configured to have substantially the same height. In some embodiments, the heights of the first part 511 and the third part 521 may be different from each other. In some embodiments, the heights of the second part 512 and the fourth part 522 may be different from each other.

According to various embodiments, the at least one support structure 500 may be formed of a metal material and/or a polymer material (e.g., TPU, PET, or PC). In some embodiments, the at least one support structure 500 may be formed of a compressible material and/or an incompressible material as a tape member. According to an embodiment, the at least one support structure 500 may be at least partially replaced with a heat dissipation member (e.g., a graphite sheet). According to an embodiment, in the at least one support structure 500, the first part 511 and the third part 521, and the second part 512 and the fourth part 522 may be formed of the same or different materials. In some embodiments, the at least one support structure 500 may be configured such that the first member 510 and the second member 520 are integrally configured. In this case, the at least one support structure 500 may be formed of a flexible material.

In the support structure 500 according to exemplary embodiments of the disclosure, the height of a part (e.g., the second part 512 and fourth part 522) corresponding to at least the third area 130c (e.g., a folding area) of the flexible display 400 may be configured to be higher than the heights of parts (e.g., the first part 511 and the third part 521) adjacent to waterproof members 481 and 484 and corresponding to the first area 130a and the second area 130b of the flexible display 400, so that it is possible to induce strong support of the flexible display 400 in the third area 130c which is bendable and to help improve durability and/or surface quality of the flexible display 400. According to an embodiment, the at least one support structure 500 is arranged to have a relatively lower height than the third area 130c in the periphery of the waterproof members 481 and 484, and thus an unattached area of the waterproof members 481 and 484 by the support structure 500 is reduced, thereby helping to improve waterproof performance.

FIG. 6A is a partial cross-sectional view of an electronic device taken along line 6a-6a of FIG. 1A according to various embodiments of the disclosure. FIG. 6B is a cross-sectional view of an electronic device illustrating a height relationship between a waterproof member and a support structure which are compressed according to assembly of a flexible display according to various embodiments of the disclosure.

Referring to FIGS. 6A and 6B, an electronic device may include a first housing 110, a second housing 120 coupled to be foldable through a hinge device 140, and a flexible display 400 supported by the first housing 110 and the second housing 120. According to an embodiment, the flexible display 400 may include a window layer 410 and a polarizing layer (polarizer, POL) 420, a display panel 430, a polymer layer 440, a support plate 450, and at least one reinforcing plate 471 and 472 which are sequentially disposed under the window layer 410. In some embodiments, the flexible display 400 may include a digitizer (e.g., the digitizer 460 of FIG. 4) disposed between the polymer layer 440 and the support plate 450 or between the support plate 450 and the at least one reinforcing plate 471 and 472. According to an embodiment, the flexible display 400 may be disposed to be supported by a first side member 113 of the first housing 110 and a second side member 123 of the second housing 120.

According to various embodiments, the electronic device 100 may include a support structure (e.g., the support structure 500 of FIG. 3) including a first member 510 disposed between a first reinforcing plate 471 and the first housing 110, and a second member 520 disposed between a second reinforcing plate 472 and the second housing 120. According to an embodiment, the first member 510 may include a first sub-member 510a disposed in an area corresponding to a third area 130c of the flexible display 400 and in at least a part of the first housing 110, and a second sub-member 510b stacked on the first sub-member 510a in an area corresponding to at least the third area 130c. According to an embodiment, the second sub-member 510b may be disposed in a size overlapping at least the third area 130a when the flexible display 400 is viewed from above. According to an embodiment, the first member 510 may include a first part 511 corresponding to the first housing 110 and configured only by an area of the first sub-member 510a, and a second part 512 corresponding to at least the third area 130a and configured by the first sub-member 510a and the second sub-member 510b. According to an embodiment, the first part 511 may be disposed up to the vicinity of a waterproof member 484 (e.g., the fourth waterproof member 484 of FIG. 3) disposed between the first housing 110 and the flexible display 400 from the third area 130c.

According to an embodiment, the second member 520 may include a third sub-member 520a disposed in at least a part of the second housing 120 and the third area 130c of the flexible display 400, and a fourth sub-member 520b stacked on the third sub-member 520a in an area corresponding to at least the third area 130c. According to an embodiment, the fourth sub-member 520b may be disposed in a size overlapping at least the third area 130c when the flexible display 400 is viewed from above. According to an embodiment, the second member 520 may include a third part 521 corresponding to the second housing 120 and configured only by an area of the third sub-member 520a, and a fourth part 522 corresponding to at least the third area 130c and configured by the third sub-member 520a and the fourth sub-member 520b. According to an embodiment, the third part 521 may be disposed up to the vicinity of a waterproof member 481 (e.g., the first waterproof member 481 of FIG. 3) disposed between the second housing 120 and the flexible display 400 from the third area 130c.

According to an embodiment, the first member 510 and the second member 520 are separated (or disconnected) from each other and disposed so as to have a predetermined gap left and right with reference to a folding axis A of the electronic device 100, thereby helping a folding operation of the electronic device. According to an embodiment, a gap formed through the first member 510 and the second member 520 may be substantially the same as a gap formed through the first reinforcing plate 471 and the second reinforcing plate 472.

According to various embodiments, a first height H1 of the first part 511 and/or the third part 521 may be lower than a second height H2 of the second part 512 and/or the fourth part 522. The different thickness portions (e.g., 511 and 512 within 510 and 521 and 522 within 520) form a stepped structure. The stepped structure is open to the waterproof member (e.g., 481 and 484 in FIG. 6A). Each respective stepped structure together with the flexible display 400, a waterproof member (e.g., 481 and 484 in FIG. 6A) and the housing (e.g., 110 and 120), define a first space 1101 or a second space 1102. According to an embodiment, the second height H2 of the second part 512 and/or the fourth part 522 may be substantially same as or lower than a height t of the waterproof members 481 and 484.

According to an embodiment, as shown in FIG. 6B, in consideration of the case where the flexible display 400 is attached to the housings 110 and 120 through a compression jig, and the waterproof members 481 and 484 are compressed, the first height H1 of the first part 511 and/or the third part 521 may be configured to have a height same as or lower than a height t1 of the compressed waterproof members 481 and 484. The flexible display 400 is attached to the housings 110 and 120 through an adhesive member P5. In this case, the first height H1 of the first part 511 and/or the third part 521 disposed around the waterproof members 481 and 484 may be configured to be lower than the height t1 of the compressed waterproof members 481 and 484, and thus the repulsive force of the first part 511 and/or the third part 521 when the waterproof members 481 and 484 which are compressed extend toward and meet the various parts is reduced, thereby enhancing the adhesive force of the waterproof members 481 and 484 and helping to improve the waterproof performance of the electronic device 100.

According to various embodiments, the support plate 450 disposed under the display panel 430 may provide flexibility through a plurality of openings 4531. According to an embodiment, the bendable third area 130c of the flexible display 400 may be provided with flexibility with reference to a folding width l disposed to correspond to the plurality of openings 4531 of the support plate 450. According to an embodiment, the folding width l may be determined through a distance p between hinge axes by a plurality of gears included in the hinge device 140. According to an embodiment, a support width W including the second sub-member 510b of the first member 510 and the fourth sub-member 520b of the second member 520 and a gap between the second sub-member 510b and the fourth sub-member 520b may be configured to be same as the folding width l of the third area 130c and/or the support plate 450, and be at least larger than the folding width l. For example, the support width W may include the second part 512 of the first member 510 including the first sub-member 510a, and the fourth part 522 of the second member 520 including the fourth sub-member 520b. Accordingly, since the second part 512 and/or the fourth part 522 disposed to be relatively thicker than the first part 511 and/or the third part 521 support a part corresponding to the third area 130c under the display panel 430, the flexible display 400 may receive help in improving durability and surface quality in the third area 130c.

Figure 7A:
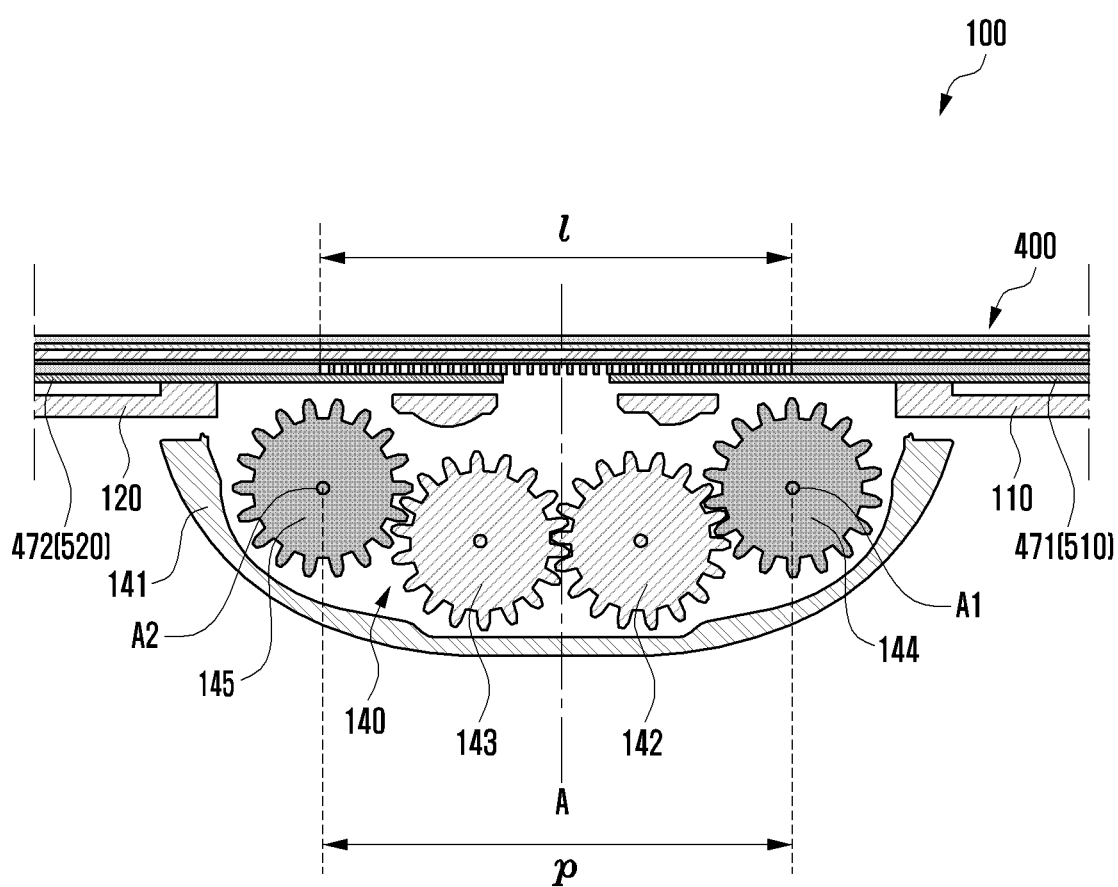
FIG. 7A is a partial cross-sectional view schematically illustrating an electronic device which is flat or unfolded, illustrating a flat state according to various embodiments of the disclosure.
Figure 7B:
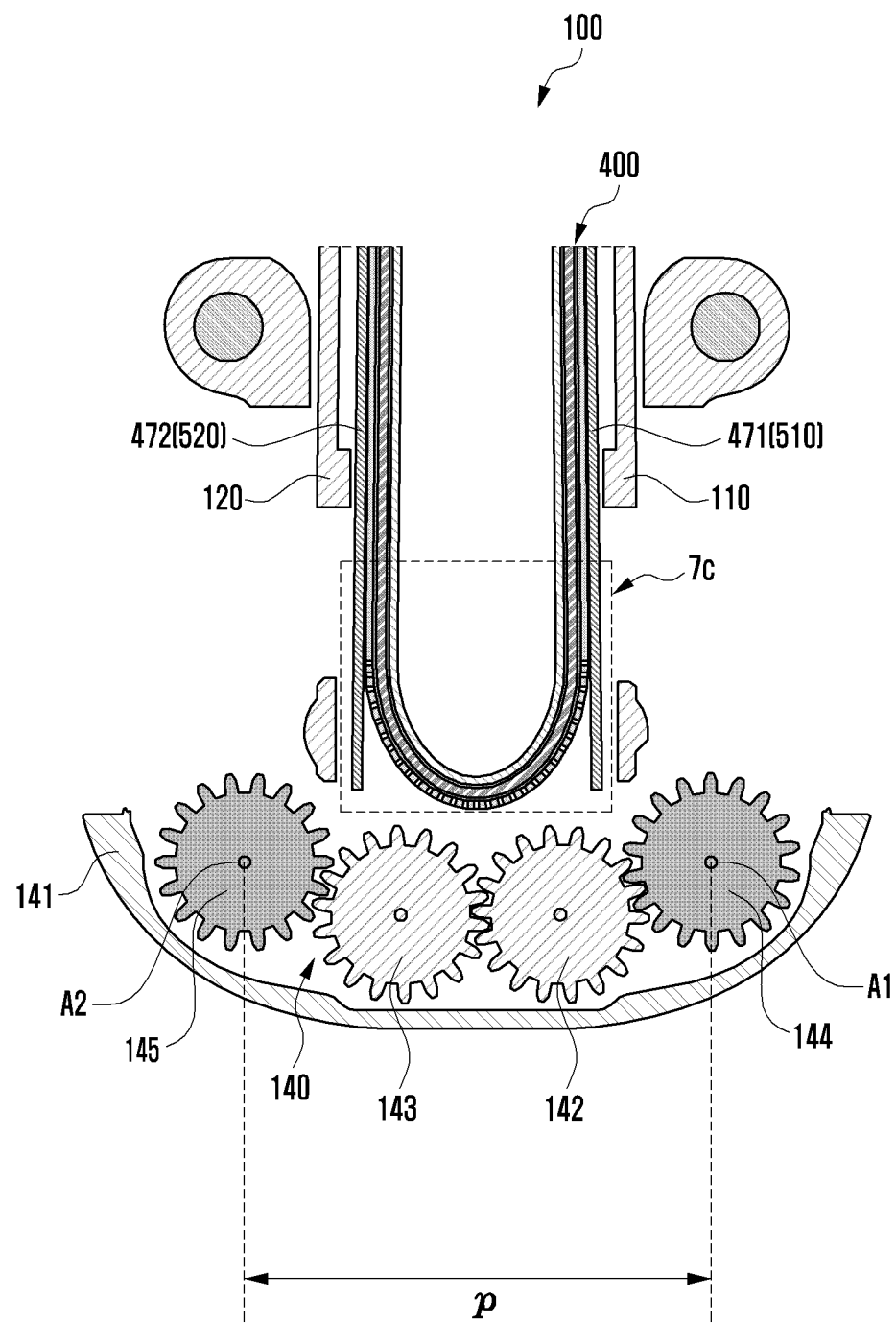
FIG. 7B is a partial cross-sectional view schematically illustrating an electronic device which is folded, illustrating a folding state according to various embodiments of the disclosure.
Figure 7C:
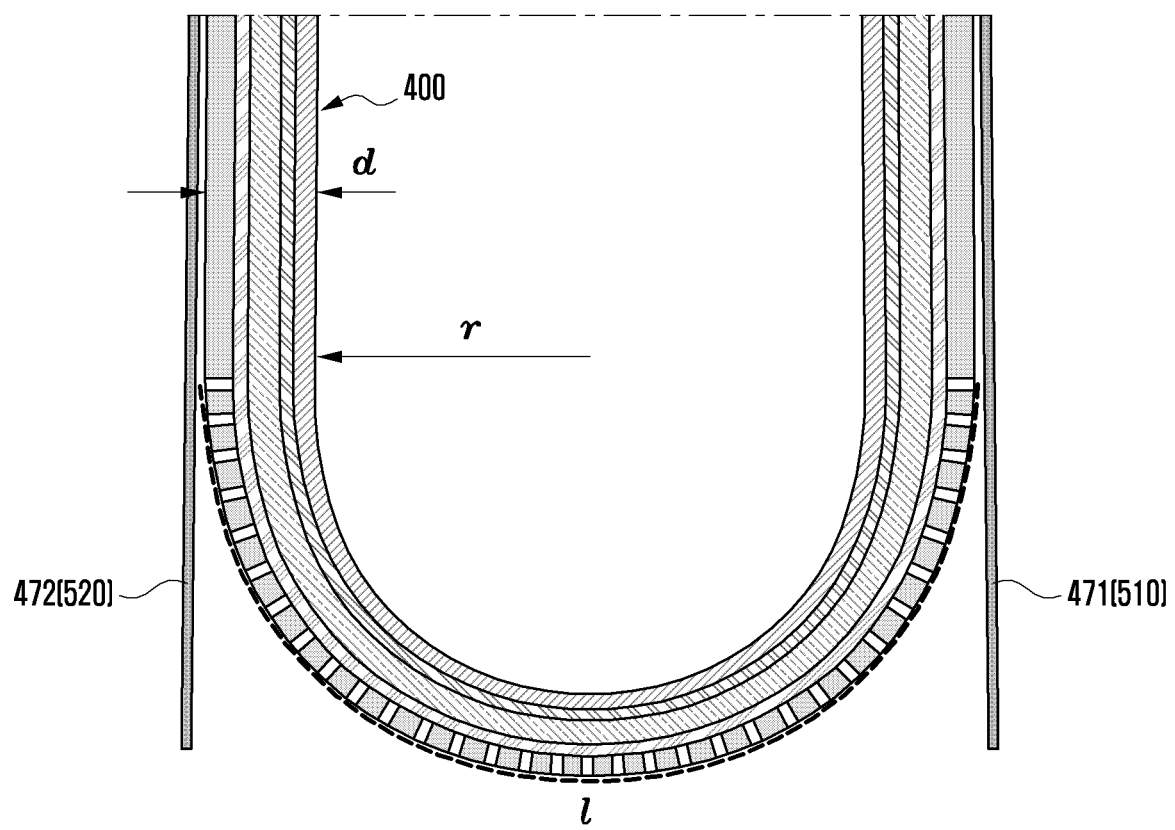
FIG. 7C is an enlarged view of area 7C of FIG. 7B according to various embodiments of the disclosure.

FIG. 7A is a partial cross-sectional view schematically illustrating an electronic device in a flat state according to various embodiments of the disclosure. FIG. 7B is a partial cross-sectional view schematically illustrating an electronic device in a folding state according to various embodiments of the disclosure. FIG. 7C is an enlarged view of area 7C of FIG. 7B according to various embodiments of the disclosure.

Referring to FIGS. 7A to 7C, an electronic device 100 may include a first housing 110, a second housing 120 foldably coupled to the first housing 110 through a hinge device 140, and a flexible display 400 disposed to be supported by the first housing 110 and the second housing 120. According to an embodiment, the hinge device 140 may include a plurality of gears 142, 143, 144, and 145, and may be disposed invisibly from the outside through a hinge housing 141. According to an embodiment, a folding width l of the flexible display 400 may be determined through an interaxial distance p between rotation shafts A1 and A2 of the hinge device coupled through the plurality of gears 142, 143, 144, and 145. According to an embodiment, the folding width l of the flexible display 400 may be determined through <equation 1>below.

$$l=\pi(r+d) \quad \text{[Equation 1]}$$

In this case, l may correspond to a folding width of the flexible display 400, r may correspond to a radius of curvature of an outer surface of a curved area when the flexible display 400 is in a folding state, and d may indicate a thickness of the flexible display 400. For example, a thickness d of the flexible display 400 may have a thickness corresponding to a vertical distance from a window layer (e.g., the window layer 410 of FIG. 6A) to a support plate (e.g., the support plate 450 of FIG. 6A).

Accordingly, a support width (e.g., the support width W of FIG. 6A) of a support structure (e.g., the support structure 500 of FIG. 5B) may be determined based on the thickness d of the flexible display 400 and the folding width l calculated through a radius of curvature r of the flexible display 400 in the folding state. For example, the support width W of the support structure 500 may be configured to be same as or larger than the calculated folding width l.

Figure 8A:
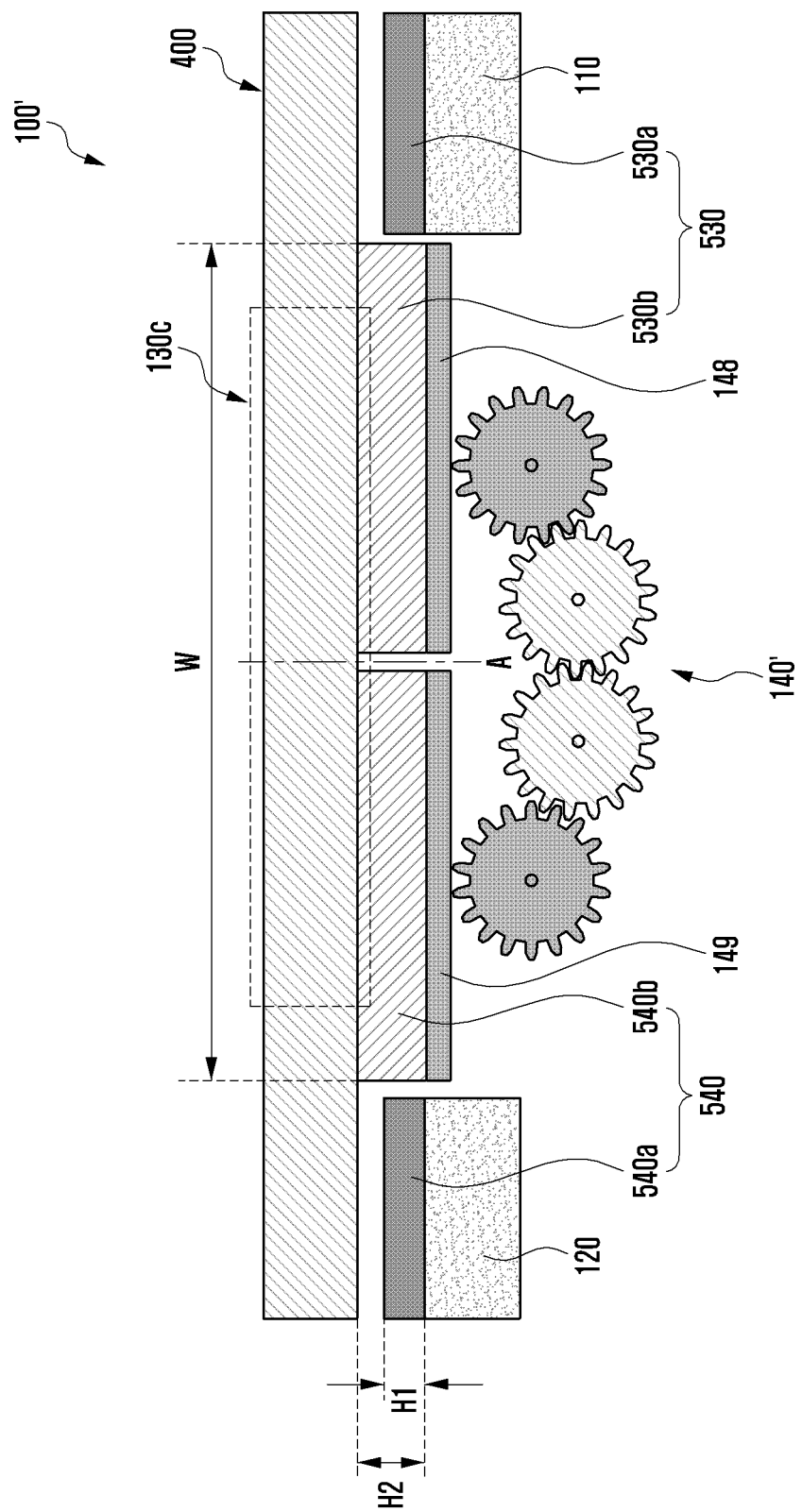
FIGS. 8A and 8B are partial cross-sectional views schematically illustrating an electronic device which is flat or unfolded, illustrating a flat state and a folding state according to various embodiments of the disclosure.
Figure 8B:
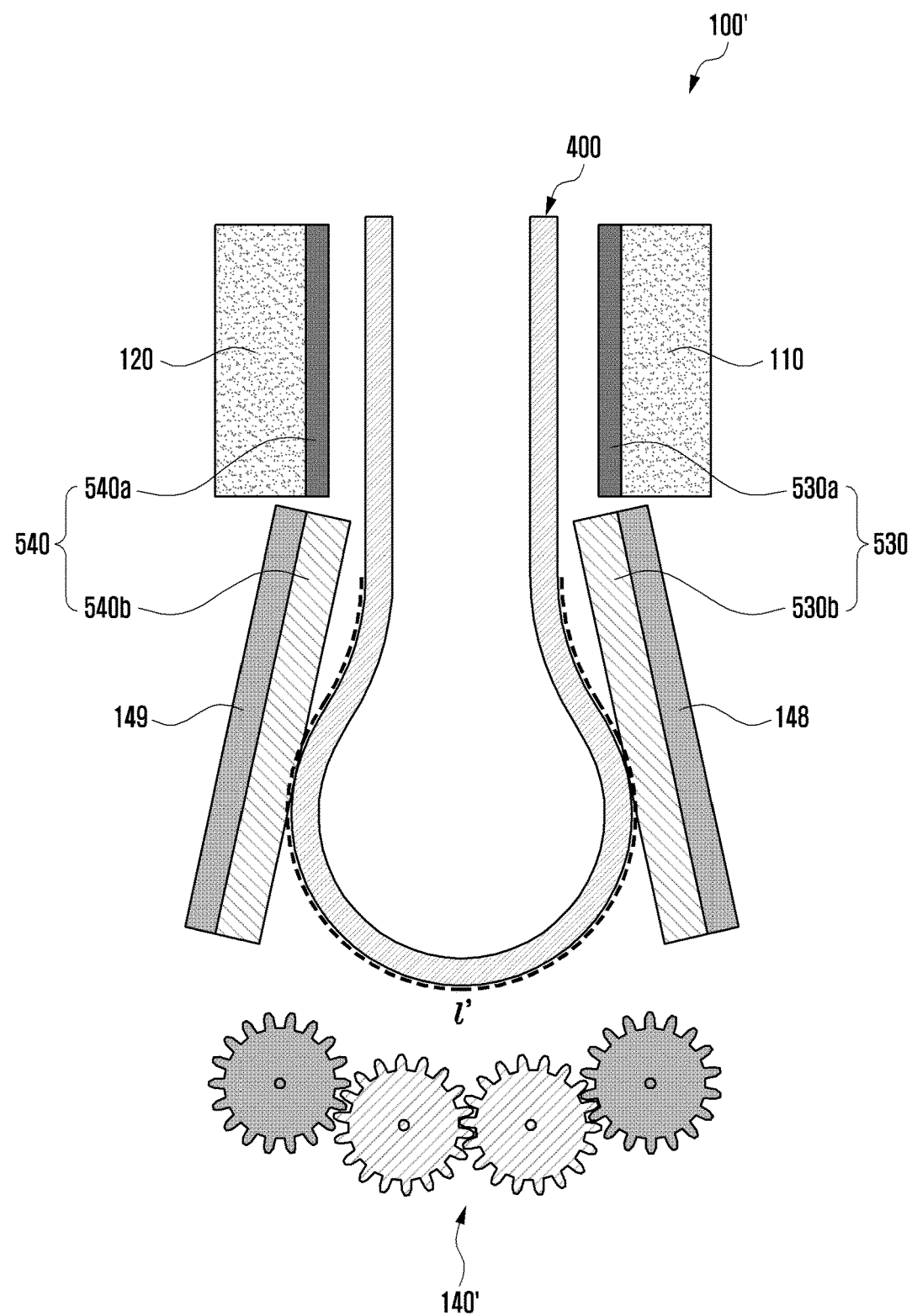

FIGS. 8A and 8B are partial cross-sectional views schematically illustrating an electronic device in a flat state and a folding state according to various embodiments of the disclosure.

Referring to FIGS. 8A and 8B, an electronic device 100' may include a first housing 110, a second housing 120 foldably coupled to the first housing 110 through a hinge device 140', and a flexible display 400 disposed to be supported by the first housing 110 and the second housing 120. According to an embodiment, the electronic device 100' may include a first link member 148 which is link-coupled to the first housing 110 and supports at least a part of the flexible display 400, and a second link member 149 which is link-coupled to the second housing 120 and supports at least a part of the flexible display 400. According to an embodiment, in a flat state, the first link member 148 and the second link member 149 configure the same plane as the first housing 110 and the second housing 120, and in a folding state, the first link member 148 and the second link member 149 may be moved to support a bent part of the flexible display 400.

According to various embodiments, the electronic device 100' may include support structures 530 and 540 for supporting the flexible display 400. According to an embodiment, the support structure may include a first member 530 including a first sub-member 530a disposed between the first housing 110 and the flexible display 400, and a second sub-member 530b disposed between the first link member 148 and the flexible display 400. In such a case, the first sub-member 530a and the second sub-member 530b may be disposed in a separated state from each other. According to an embodiment, the support structure may include a second member 540 including a third sub-member 540a disposed between the second housing 120 and the flexible display 400, and a fourth sub-member 540b disposed between the second link member 149 and the flexible display 400. In such a case, the third sub-member 540a and the fourth sub-member 540b may be disposed in a separated state from each other. According to an embodiment, the second sub-member 530b and the fourth sub-member 540b may be disposed to support at least a part of a third area 130c (e.g., a folding area) of the flexible display 400. Even in such a case, a support width W formed by the second sub-member 530b and the fourth sub-member 540b may be same as or greater than a folding width l' of the flexible display 400 corresponding to at least the third area 130c. According to an embodiment, a height H1 of the first sub-member 530a and/or the third sub-member 540a may be configured to be lower than a height H2 of the second sub-member 530b and/or the fourth sub-member 540b.

FIGS. 9A to 9D are views illustrating various examples of a support structure according to various embodiments of the disclosure.

Figure 9A:
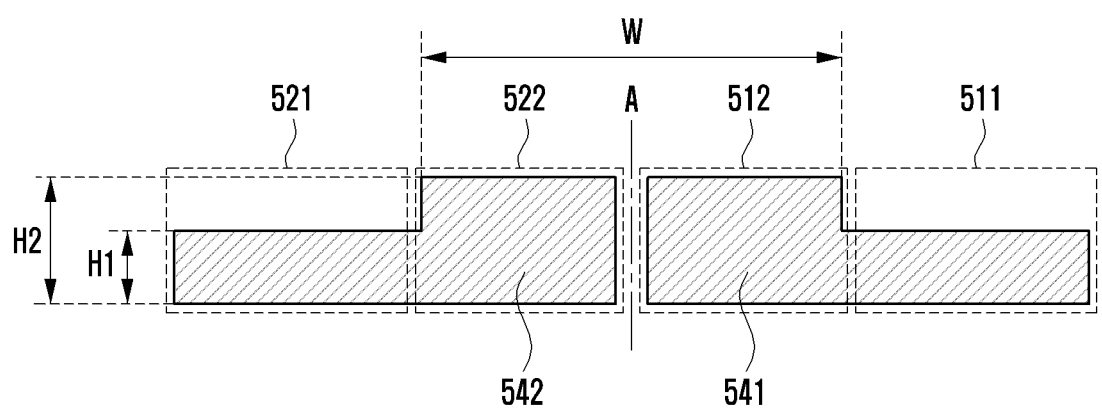
FIGS. 9A to 9D are views illustrating various examples of a support structure according to various embodiments of the disclosure.

Referring to FIG. 9A, support structures 541 and 542 together define a support structure and may include a first member 541 disposed on one side with reference to a folding axis A, and a second member 542 disposed on the other side. According to an embodiment, the first member 541 may include a first part 511 (or first thickness portion) having a first height H1, and a second part 512 (or second thickness portion) connected to the first part 511 and having a second height H2 which is higher (or larger) than the first height H1. According to an embodiment, the second member 542 may include a third part 521 having a first height H1, and a fourth part 522 connected to the third part 521 and having a second height H2 which is higher than the first height H1. According to an embodiment, in the first member 541, the first part 511 and the second part 512 may be integrally configured, that is, to define a single, continuous body. According to an embodiment, in the second member 542, the third part 521 and the fourth part 522 may be integrally configured. Accordingly, the second part 512 of the first member 541 and the fourth part 522 of the second member 542, which have a relatively higher height than a height at the periphery (e.g., furthest from the folding axis A), may be configured to have a sufficient support width W for supporting a third area (e.g., the third area 130c of FIG. 6A) of a flexible display (e.g., the flexible display 400 of FIG. 6A).

Figure 9B:
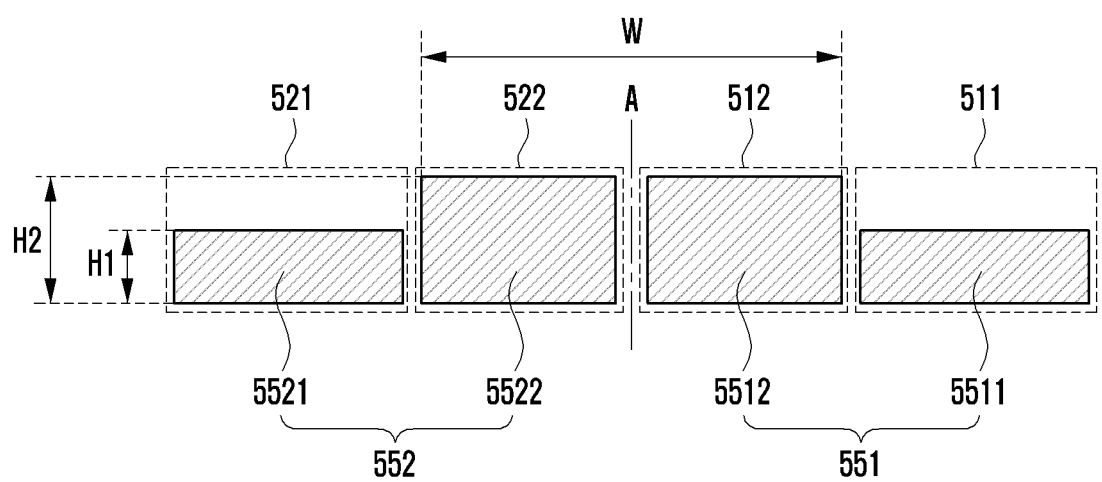

Referring to FIG. 9B, support structures 551 and 552 may include a first member 551 disposed on one side with reference to a folding axis A, and a second member 552 disposed on the other side. According to an embodiment, the first member 551 may include a first sub-member 5511 disposed to have a first height H1 in the first part 511, and a second sub-member 5512 which is disposed to be separate from (e.g., disconnected from) the first sub-member 5511 in the second part 512 connected to the first part 511 and has a second height H2 higher than the first height H1. According to an embodiment, the second member 552 may include a third sub-member 5521 disposed to have a first height H1 in the third part 521, and a fourth sub-member 5522 which is disposed to be separate from the third sub-member 5521 in the fourth part 522 connected to the third part 521 and has a second height H2 higher than the first height H1. According to an embodiment, the second sub-member 5512 of the first member 551 and the fourth sub-member 5522 of the second member 552, which have a relatively higher height than the periphery, may be configured to have a sufficient support width W for supporting a third area (e.g., the third area 130c of FIG. 6A) of a flexible display (e.g., the flexible display 400 of FIG. 6A).

Figure 9C:
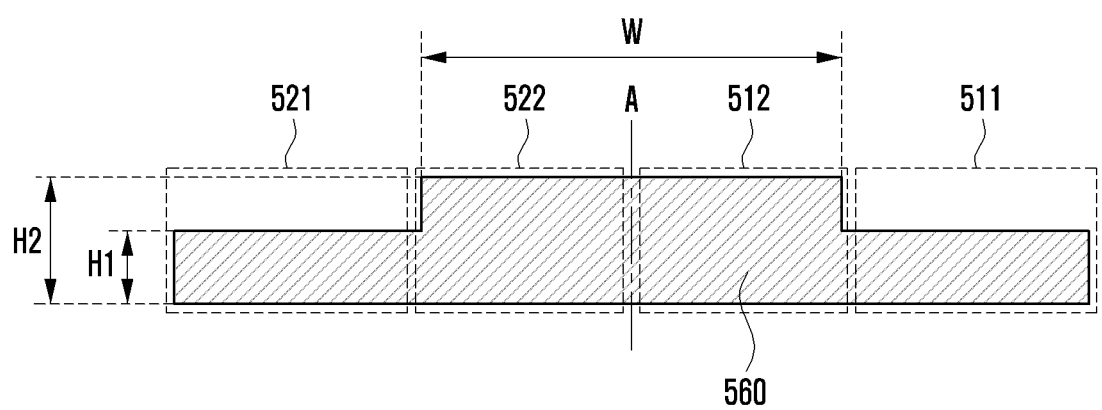

Referring to FIG. 9C, a support structure 560 may include a first part 511 disposed on one side with reference to a folding axis A and having a first height H1, and a second part 512 extending from the first part 511, and may include a third part 521 disposed on the other side of the folding shaft A, and a fourth part 522 extending from the third part 521. According to an embodiment, the first, second, third, and fourth parts 511, 512, 521, and 522 may be integrally configured. According to an embodiment, a first height H1 of the first part 511 and the third part 521 may be lower than a second height H2 of the second part 512 and the fourth part 522. For example, the integrally configured support structure 560 may be formed of an elastic material (e.g., rubber, urethane, silicone, or TPU) for providing flexibility in a third area (e.g., the third area 130c of FIG. 6A). According to an embodiment, the second part 512 and the fourth part 522 configured to have a relatively higher height than the periphery may be configured to have a sufficient support width W for supporting a third area (e.g., the third area 130c of FIG. 6A) of a flexible display (e.g., the flexible display 400 of FIG. 6A).

Figure 9D:
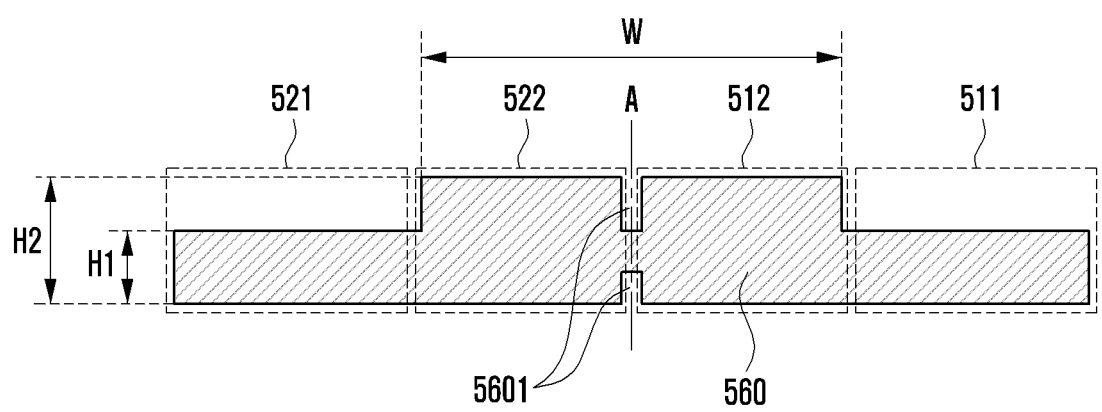

In FIG. 9D, the unified support structure 560 of FIG. 9C may further include at least one groove 5601 (e.g., a recess) having a specified depth along a folding axis A. According to an embodiment, the at least one groove 5601 may help to improve the flexibility of the support structure 560 which is folded with reference to the folding axis A.

According to various embodiments, an electronic device (e.g., the electronic device 100 of FIG. 6A) may include a first housing (e.g., the first housing 110 of FIG. 6A), a second housing (e.g., the second housing 120 of FIG. 6A) which is foldably coupled to the first housing through a hinge device (e.g., the hinge device 140 of FIG. 6A), and a flexible display (e.g., the flexible display 400 of FIG. 6A) disposed to be supported by the first housing and the second housing and including a folding area (e.g., the third area 130c of FIG. 6A) which is deformed in a folding state, at least one waterproof member (e.g., the waterproof members 481 and 484 of FIG. 6A) disposed between the first housing and the flexible display and/or between the second housing and the flexible display, and at least one support structure (e.g., the support structure 500 of FIG. 5B) disposed between the first housing and the flexible display and/or between the second housing and the flexible display in a periphery of the at least one waterproof member, where the at least one support structure includes a first part (e.g., the first part 511 of FIG. 6A) disposed to have a first height (e.g., the first height H1 of FIG. 6A), and a second part (e.g., the second part 512 of FIG. 6A) disposed to have a second height (e.g., the second height H2 of FIG. 6A) higher than the first height, and at least a part of the second part is disposed at a position overlapping at least a part of at least the folding area when the flexible display is viewed from above.

According to various embodiments, a width of the second part may be disposed to be the same as or larger than a width of the folding area.

According to various embodiments, the first height may be configured to be the same as or lower than a height of the at least one waterproof member.

According to various embodiments, the first height may be configured to be the same as or lower than the height of the at least one waterproof member which is compressed when the flexible display is assembled.

According to various embodiments, the at least one support structure may be dividedly disposed with reference to a folding axis of the folding area.

According to various embodiments, the at least one support structure may include a first member disposed between the first housing and the flexible display, and a second member disposed between the second housing and the flexible display.

According to various embodiments, the first member may include a first sub-member having the first height, and a second sub-member stacked on the first sub-member and configuring the second height together with the first sub-member.

According to various embodiments, the second member may include a third sub-member having the first height, and a fourth sub-member stacked on the third sub-member and configuring the second height together with the third sub-member.

According to various embodiments, at least a part of the second sub-member and at least a part of the fourth sub-member may be disposed at a position overlapping the folding area when the flexible display is viewed from above.

According to various embodiments, the first part and the second part may be integrally configured.

According to various embodiments, the first part and the second part may be disposed separately.

According to various embodiments, the hinge device may include a first rotation shaft for movement of the first housing, and a second rotation shaft for movement of the second housing, and the second part may be configured to be same as or greater than an interaxial distance between the first rotation shaft and the second rotation shaft.

According to various embodiments, the flexible display may include a window layer, a display panel disposed under the window layer, a support plate disposed under the display panel and including a plurality of openings in a part corresponding to the folding area, a first reinforcing plate disposed under the support plate and in a part corresponding to the first housing, and a second reinforcing plate disposed under the support plate and in a part corresponding to the second housing.

According to various embodiments, the at least one support structure and the at least one waterproof member may be disposed between the first reinforcing plate and the first housing and/or between the second reinforcing plate and the second housing.

According to various embodiments, the at least one support structure may be formed of at least one of a metal material, a polymer material, a compressible material, an incompressible material, or a heat dissipation member.

According to various embodiments, an electronic device (e.g., the electronic device 100 of FIG. 6A) may include a first housing (e.g., the first housing 110 of FIG. 6A), a second housing (e.g., the second housing 120 of FIG. 6A) which is foldably coupled to the first housing through a hinge device (e.g., the hinge device 140 of FIG. 6A), and a flexible display (e.g., the flexible display 400 of FIG. 6A) disposed to be supported by the first housing and the second housing and including a folding area (e.g., the third area 130c of FIG. 6A) which is deformed in a folding state, the flexible display including a window layer (e.g., the window layer 410 of FIG. 6A), a display panel (e.g., the display panel 430 of FIG. 6A) disposed under the window layer, a support plate (e.g., the support plate 450 of FIG. 6A) disposed under the display panel and including a plurality of openings (e.g., the openings 4531 of FIG. 6A) in a part corresponding to the folding area, a first reinforcing plate (e.g., the first reinforcing plate 471 of FIG. 6A) disposed under the support plate and in a part corresponding to the first housing, and a second reinforcing plate (e.g., the second reinforcing plate 472 of FIG. 6A) disposed under the support plate and in a part corresponding to the second housing, and include at least one waterproof member (e.g., the waterproof members 481 and 484 of FIG. 6A) disposed between the first reinforcing plate and the first housing and/or between the second reinforcing plate and the second housing, and at least one support structure (e.g., the support structure 500 of FIG. 5B)

disposed between the first reinforcing plate and the first housing and/or between the second reinforcing plate and the second housing in a periphery of the at least one waterproof member, where the at least one support structure includes a first part (e.g., the first part 511 of FIG. 6A) disposed to have a first height (e.g., the first height H1 of FIG. 6A), and a second part (e.g., the second part 512 of FIG. 6A) disposed to have a second height (e.g., the second height H2 of FIG. 6A) higher than the first height, and at least a part of the second part is disposed at a position overlapping at least a part of at least the folding area when the flexible display is viewed from above.

According to various embodiments, the first height may be configured to be the same as or lower than a height of the at least one waterproof member.

According to various embodiments, the at least one support structure may be dividedly disposed with reference to a folding axis of the folding area.

According to various embodiments, the first part and the second part may be integrally configured.

According to various embodiments, the first part and the second part may be disposed separately.

In addition, the embodiments of the disclosure disclosed in the specification and drawings are provided only to provide a specific example in order to easily describe the technical content according to the embodiment of the disclosure and to help understanding of the embodiments of the disclosure, and are not intended to limit the scope of the embodiments of the disclosure. Therefore, the scope of various embodiments of the disclosure should be interpreted to include all changes or modified forms derived based on the technical spirit of various embodiments of the disclosure in addition to the embodiments disclosed herein.

Throughout the disclosure, like reference numerals refer to like elements throughout. As used herein, a reference number may indicate a singular element or a plurality of the element. For example, a reference number labeling a singular form of an element within the drawing figures may be used to reference a plurality of the singular element within the text of specification.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The invention claimed is:

1. An electronic device comprising:
a first housing;
a second housing which is foldably coupled to the first housing through a hinge device;

a flexible display disposed to be supported by the first housing and the second housing, the flexible display comprising a folding area which is foldable;

at least one waterproof member disposed between the first housing and the flexible display and/or between the second housing and the flexible display;

at least one support structure disposed between the first housing and the flexible display and/or between the second housing and the flexible display, non-overlapping the at least one waterproof member when the flexible display is viewed from above;

the at least one waterproof member and the at least one support structure disposed side by side between the first housing and the flexible display or between the second housing and the flexible display, wherein the at least one support structure comprises:
- a first part disposed to have a first height, the first part which has the first height is non-overlapping the at least one waterproof member and the folding area when the flexible display is viewed from above,
- a second part disposed to have a second height which is larger than the first height and substantially equal to a height of the at least one waterproof member, a portion of the second part which has the second height is overlapping the folding area when the flexible display is viewed from above, and
- a stepped structure provided through a height difference between the first part and the second part, wherein the stepped structure provides a space between the flexible display and the first part of the at least one support structure.

2. The electronic device of claim 1, wherein a size of the second part is disposed to be the same as or larger than the folding area.

3. The electronic device of claim 2, wherein the first part which has the first height and the second part which has the second height larger than the first height, are disconnected from each other.

4. The electronic device of claim 1, wherein the first height is configured to be lower than the height of the at least one waterproof member.

5. The electronic device of claim 4, wherein the first height is configured to be the same as or lower than the height of the at least one waterproof member which is compressed when the flexible display is assembled.

6. The electronic device of claim 1, wherein the at least one support structure is dividedly disposed with reference to a folding axis of the folding area.

7. The electronic device of claim 6, wherein the at least one support structure comprises:
- a first member disposed between the first housing and the flexible display; and
- a second member disposed between the second housing and the flexible display.

8. The electronic device of claim 7, wherein the first member comprises:
- a first sub-member having the first height; and
- a second sub-member stacked on the first sub-member and configuring the second height together with the first sub-member.

9. The electronic device of claim 8, wherein the second member comprises:
- a third sub-member having the first height; and
- a fourth sub-member stacked on the third sub-member and configuring the second height together with the third sub-member.

10. The electronic device of claim 9, wherein at least a part of the second sub-member and at least a part of the fourth sub-member are disposed at a position overlapping the folding area when the flexible display is viewed from above.

11. The electronic device of claim 1, wherein the first part and the second part are integrally configured.

12. The electronic device of claim 1, wherein
the hinge device comprises a first rotation shaft for movement of the first housing, and a second rotation shaft for movement of the second housing,
the first rotation shaft and the second rotation shaft are spaced apart by an interaxial distance, and
a width of the second part is configured to be same as or greater than the interaxial distance between the first rotation shaft and the second rotation shaft.

13. The electronic device of claim 1, wherein the flexible display comprises:
- a window layer;
- a display panel disposed under the window layer;
- a support plate disposed under the display panel and a plurality of openings defined in the support plate and corresponding to the folding area;
- a first reinforcing plate disposed under the support plate and corresponding to the first housing; and
- a second reinforcing plate disposed under the support plate and corresponding to the second housing.

14. The electronic device of claim 13, wherein the at least one support structure and the at least one waterproof member are disposed between the first reinforcing plate and the first housing and/or between the second reinforcing plate and the second housing.

15. The electronic device of claim 1, wherein the at least one support structure includes at least one of a metal material, a polymer material, a compressible material, an incompressible material, or a heat dissipation member.

16. An electronic device comprising:
a first housing;
a second housing which is foldably coupled to the first housing through a hinge device;
a flexible display disposed to be supported by the first housing and the second housing, the flexible display comprising:
- a folding area which is foldable;
- a window layer;
- a display panel disposed under the window layer;
- a support plate disposed under the display panel and comprising a plurality of openings in a part corresponding to the folding area;
- a first reinforcing plate disposed under the support plate and corresponding to the first housing; and
- a second reinforcing plate disposed under the support plate and corresponding to the second housing;

at least one waterproof member disposed between the first reinforcing plate and the first housing and/or between the second reinforcing plate and the second housing; and at least one support structure disposed parallel to the at least one waterproof member in between the first reinforcing plate and the first housing and/or between the second reinforcing plate and the second housing, non-overlapping the at least one waterproof member when the flexible display is viewed from above, wherein the at least one support structure comprises:
- a first part disposed to have a first height, the first part which has the first height is non-overlapping the at least one waterproof member and the folding area when the flexible display is viewed from above, a second part disposed to have a second height which is larger than the first height and substantially equal to a height of the at least one waterproof member, a portion of the second part which has the second height is overlapping the folding area when the flexible display is viewed from above, and a stepped structure provided through a height difference between the first part and the second part, wherein the stepped structure provides a space between a first reinforcing plate and the first part and/or between a second reinforcing plate and the first part.

17. The electronic device of claim 16, wherein the first height is configured to be lower than the height of the at least one waterproof member.

18. The electronic device of claim 16, wherein the at least one support structure is dividedly disposed with reference to a folding axis of the folding area.

19. The electronic device of claim 16, wherein the first part and the second part are integrally configured.

20. The electronic device of claim 16, wherein the first part and the second part are separately arranged.

\* \* \* \* \*